(12) United States Patent
Fisher et al.

(10) Patent No.: US 10,180,977 B2
(45) Date of Patent: *Jan. 15, 2019

(54) DETERMINING AND EXTRACTING CHANGED DATA FROM A DATA SOURCE

(71) Applicant: Palantir Technologies Inc., Palo Alto, CA (US)

(72) Inventors: William Fisher, New York, NY (US); Peter Maag, New York, NY (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/220,021

(22) Filed: Jul. 26, 2016

(65) Prior Publication Data

US 2016/0335342 A1 Nov. 17, 2016

Related U.S. Application Data

(63) Continuation of application No. 15/066,970, filed on Mar. 10, 2016, now Pat. No. 9,449,074, which is a (Continued)

(51) Int. Cl.
*G06F 17/30* (2006.01)
*G06F 7/24* (2006.01)
*G06F 11/14* (2006.01)

(52) U.S. Cl.
CPC .......... *G06F 17/30598* (2013.01); *G06F 7/24* (2013.01); *G06F 11/1453* (2013.01);
(Continued)

(58) Field of Classification Search
CPC ........... G06F 17/3023; G06F 17/30174; G06F 17/30386; G06F 17/30598; Y10S 707/99954
See application file for complete search history.

(56) References Cited

U.S. PATENT DOCUMENTS 5,109,399 A 4/1992 Thompson
5,241,625 A 8/1993 Epard et al.
(Continued)

FOREIGN PATENT DOCUMENTS

CA 2828264 4/2014
CA 2829266 6/2017
(Continued)

OTHER PUBLICATIONS

"A Quick Guide to UniProtKB Swiss-Prot & TrEMBL," Sep. 2011, pp. 2.
(Continued)

*Primary Examiner* — Cheryl Lewis
(74) *Attorney, Agent, or Firm* — Knobbe Martens Olson & Bear LLP

(57) ABSTRACT

According to certain aspects, a computer system may be configured to obtain information indicating a plurality of groupings of data stored in a data source, the information indicating a number of data items included in each of the plurality of groupings; determine a first grouping of the plurality of groupings including one or more data items that have changed by comparing a first number of data items included in the first grouping and a historical first number of data items included in a corresponding local version of the first grouping; access data items included in the first grouping from the data source; compare the data items included in the first grouping to data items of the corresponding local version of the first grouping to determine which data items have changed; extract the changed data items of the first grouping; and forward the extracted data items to a destination system.

23 Claims, 7 Drawing Sheets

Related U.S. Application Data continuation of application No. 14/581,902, filed on Dec. 23, 2014, now Pat. No. 9,292,388, which is a continuation of application No. 14/254,773, filed on Apr. 16, 2014, now Pat. No. 8,924,429.

(60) Provisional application No. 61/955,054, filed on Mar. 18, 2014.

(52) U.S. Cl.
CPC ........ *G06F 17/30* (2013.01); *G06F 17/30156* (2013.01); *G06F 17/30174* (2013.01); *G06F 17/30353* (2013.01); *G06F 17/30386* (2013.01); *G06F 17/30424* (2013.01); *G06F 17/30551* (2013.01)

(56) References Cited

U.S. PATENT DOCUMENTS

| | | |
|---|---|---|
| 5,329,108 A | 7/1994 | Lamoure |
| 5,412,769 A | 5/1995 | Maruoka et al. |
| 5,414,838 A | 5/1995 | Kolton et al. |
| 5,418,950 A | 5/1995 | Li et al. |
| 5,428,737 A | 6/1995 | Li et al. |
| 5,428,776 A | 6/1995 | Rothfield |
| 5,444,819 A | 8/1995 | Negishi |
| 5,454,104 A | 9/1995 | Steidlmayer et al. |
| 5,542,089 A | 7/1996 | Lindsay et al. |
| 5,568,390 A | 10/1996 | Hirota et al. |
| 5,608,899 A | 3/1997 | Li et al. |
| 5,613,105 A | 3/1997 | Xbikowski et al. |
| 5,632,009 A | 5/1997 | Rao et al. |
| 5,670,987 A | 9/1997 | Doi et al. |
| 5,701,456 A | 12/1997 | Jacopi et al. |
| 5,724,575 A | 3/1998 | Hoover et al. |
| 5,781,704 A | 7/1998 | Rossmo |
| 5,794,228 A | 8/1998 | French et al. |
| 5,794,229 A | 8/1998 | French et al. |
| 5,798,769 A | 8/1998 | Chiu et al. |
| 5,819,226 A | 10/1998 | Gopinathan et al. |
| 5,819,238 A | 10/1998 | Fernholz |
| 5,826,021 A | 10/1998 | Mastors et al. |
| 5,832,218 A | 11/1998 | Gibbs et al. |
| 5,845,300 A | 12/1998 | Comer |
| 5,845,530 A | 12/1998 | Brockmeyer et al. |
| 5,857,329 A | 1/1999 | Bingham |
| 5,872,973 A | 2/1999 | Mitchell et al. |
| 5,878,434 A | 3/1999 | Draper et al. |
| 5,892,900 A | 4/1999 | Ginter et al. |
| 5,897,636 A | 4/1999 | Kaeser |
| 5,902,349 A | 5/1999 | Endo et al. |
| 5,911,138 A | 6/1999 | Li et al. |
| 5,918,225 A | 6/1999 | White et al. |
| 5,966,706 A | 10/1999 | Biliris et al. |
| 5,999,911 A | 12/1999 | Berg et al. |
| 6,006,242 A | 12/1999 | Poole et al. |
| 6,012,042 A | 1/2000 | Black et al. |
| 6,057,757 A | 5/2000 | Arrowsmith et al. |
| 6,065,026 A | 5/2000 | Cornelia et al. |
| 6,072,942 A | 6/2000 | Stockwell et al. |
| 6,091,956 A | 7/2000 | Hollenberg |
| 6,094,643 A | 7/2000 | Anderson et al. |
| 6,104,401 A | 8/2000 | Parsons |
| 6,134,582 A | 10/2000 | Kennedy |
| 6,161,098 A | 12/2000 | Wallman |
| 6,189,005 B1 | 2/2001 | Chakrabarti et al. |
| 6,208,985 B1 | 3/2001 | Krehel |
| 6,219,053 B1 | 4/2001 | Tachibana et al. |
| 6,232,971 B1 | 5/2001 | Haynes |
| 6,236,994 B1 | 5/2001 | Swartz et al. |
| 6,237,138 B1 | 5/2001 | Hameluck et al. |
| 6,243,706 B1 | 6/2001 | Moreau et al. |
| 6,243,717 B1 | 6/2001 | Gordon et al. |
| 6,247,019 B1 | 6/2001 | Davies |
| 6,279,018 B1 | 8/2001 | Kudrolli et al. |
| 6,289,334 B1 | 9/2001 | Reiner et al. |
| 6,289,338 B1 | 9/2001 | Stoffel et al. |
| 6,311,181 B1 | 10/2001 | Lee et al. |
| 6,313,833 B1 | 11/2001 | Knight |
| 6,321,274 B1 | 11/2001 | Shakib et al. |
| 6,341,310 B1 | 1/2002 | Leshem et al. |
| 6,349,315 B1 | 2/2002 | Sonoyama et al. |
| 6,366,933 B1 | 4/2002 | Ball et al. |
| 6,369,835 B1 | 4/2002 | Lin |
| 6,370,538 B1 | 4/2002 | Lamping et al. |
| 6,430,305 B1 | 8/2002 | Decker |
| 6,456,997 B1 | 9/2002 | Shukla |
| 6,463,404 B1 | 10/2002 | Appleby |
| 6,496,774 B1 | 12/2002 | Davies |
| 6,496,817 B1 | 12/2002 | Whang et al. |
| 6,513,019 B2 | 1/2003 | Lewis |
| 6,519,627 B1 | 2/2003 | Dan et al. |
| 6,523,019 B1 | 2/2003 | Borthwick |
| 6,532,449 B1 | 3/2003 | Goertzel et al. |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,608,559 B1 | 8/2003 | Lemelson et al. |
| 6,631,496 B1 | 10/2003 | Li et al. |
| 6,640,231 B1 | 10/2003 | Andersen et al. |
| 6,642,945 B1 | 11/2003 | Sharpe |
| 6,643,613 B2 | 11/2003 | McGee et al. |
| 6,662,202 B1 | 12/2003 | Krusche et al. |
| 6,665,683 B1 | 12/2003 | Meltzer |
| 6,674,434 B1 | 1/2004 | Chojnacki et al. |
| 6,714,936 B1 | 3/2004 | Nevin, III |
| 6,745,382 B1 | 6/2004 | Zothner |
| 6,748,481 B1 | 6/2004 | Parry et al. |
| 6,775,675 B1 | 8/2004 | Nwabueze et al. |
| 6,801,201 B2 | 10/2004 | Escher |
| 6,820,135 B1 | 11/2004 | Dingman |
| 6,828,920 B2 | 12/2004 | Owen et al. |
| 6,839,745 B1 | 1/2005 | Dingari et al. |
| 6,851,108 B1 | 2/2005 | Syme et al. |
| 6,857,120 B1 | 2/2005 | Arnold et al. |
| 6,876,981 B1 | 4/2005 | Berckmans |
| 6,877,137 B1 | 4/2005 | Rivette et al. |
| 6,907,426 B2 | 6/2005 | Hellerstein et al. |
| 6,920,453 B2 | 7/2005 | Mannila et al. |
| 6,944,821 B1 | 9/2005 | Bates et al. |
| 6,976,024 B1 | 12/2005 | Chavez et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,028,223 B1 | 4/2006 | Kolawa et al. |
| 7,036,085 B2 | 4/2006 | Barros |
| 7,043,449 B1 | 5/2006 | Li et al. |
| 7,043,702 B2 | 5/2006 | Chi et al. |
| 7,055,110 B2 | 5/2006 | Kupka et al. |
| 7,058,648 B1 | 6/2006 | Lightfoot et al. |
| 7,085,890 B2 | 8/2006 | Kashyap |
| 7,086,028 B1 | 8/2006 | Davis et al. |
| 7,089,541 B2 | 8/2006 | Ungar |
| 7,111,231 B1 | 9/2006 | Huck et al. |
| 7,133,409 B1 | 11/2006 | Willardson |
| 7,139,800 B2 | 11/2006 | Bellotti et al. |
| 7,155,728 B1 | 12/2006 | Prabhu et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,174,377 B2 | 2/2007 | Bernard et al. |
| 7,181,423 B2 | 2/2007 | Blanchard et al. |
| 7,185,065 B1 | 2/2007 | Holtzman et al. |
| 7,213,030 B1 | 5/2007 | Jenkins |
| 7,216,133 B2 | 5/2007 | Wu |
| 7,216,299 B2 | 5/2007 | Knight |
| 7,237,192 B1 | 6/2007 | Stephenson et al. |
| 7,240,330 B2 | 7/2007 | Fairweather |
| 7,246,090 B1 | 7/2007 | Thomas |
| 7,269,786 B1 | 9/2007 | Malloy et al. |

(56) References Cited

U.S. PATENT DOCUMENTS

| | | | |
|---|---|---|---|
| 7,278,105 | B1 | 10/2007 | Kitts |
| 7,290,698 | B2 | 11/2007 | Poslinski et al. |
| 7,333,998 | B2 | 2/2008 | Heckerman et al. |
| 7,356,504 | B2 | 4/2008 | Muller |
| 7,370,047 | B2 | 5/2008 | Gorman |
| 7,379,811 | B2 | 5/2008 | Rasmussen et al. |
| 7,379,903 | B2 | 5/2008 | Caballero et al. |
| 7,392,254 | B1 | 6/2008 | Jenkins |
| 7,401,038 | B2 | 7/2008 | Masuda |
| 7,403,921 | B2 | 7/2008 | Tanpoco et al. |
| 7,403,922 | B1 | 7/2008 | Lewis et al. |
| 7,403,942 | B1 | 7/2008 | Bayliss |
| 7,406,592 | B1 | 7/2008 | Polyudov |
| 7,409,357 | B2 | 8/2008 | Schaf et al. |
| 7,426,654 | B2 | 9/2008 | Adams et al. |
| 7,437,728 | B2 | 10/2008 | Stackhouse et al. |
| 7,441,182 | B2 | 10/2008 | Beilinson et al. |
| 7,454,466 | B2 | 11/2008 | Bellotti et al. |
| 7,461,158 | B2 | 12/2008 | Rider et al. |
| 7,467,375 | B2 | 12/2008 | Tondreau et al. |
| 7,469,238 | B2 | 12/2008 | Satchwell |
| 7,487,139 | B2 | 2/2009 | Fraleigh et al. |
| 7,502,786 | B2 | 3/2009 | Liu et al. |
| 7,519,589 | B2 | 4/2009 | Charnock et al. |
| 7,525,422 | B2 | 4/2009 | Bishop et al. |
| 7,529,727 | B2 | 5/2009 | Arning et al. |
| 7,529,734 | B2 | 5/2009 | Dirisala |
| 7,533,069 | B2 | 5/2009 | Fairweather |
| 7,542,934 | B2 | 6/2009 | Markel |
| 7,546,245 | B2 | 6/2009 | Surpin et al. |
| 7,546,353 | B2 | 6/2009 | Hesselink et al. |
| 7,558,677 | B2 | 7/2009 | Jones |
| 7,574,409 | B2 | 8/2009 | Patinkin |
| 7,574,428 | B2 | 8/2009 | Leiserowitz et al. |
| 7,579,965 | B2 | 8/2009 | Bucholz |
| 7,587,352 | B2 | 9/2009 | Arnott |
| 7,590,582 | B2 | 9/2009 | Dunne |
| 7,596,285 | B2 | 9/2009 | Brown et al. |
| 7,603,229 | B2 | 10/2009 | Goldberg et al. |
| 7,610,290 | B2 | 10/2009 | Kruy et al. |
| 7,614,006 | B2 | 11/2009 | Molander |
| 7,617,232 | B2 | 11/2009 | Gabbert et al. |
| 7,620,582 | B2 | 11/2009 | Masuda |
| 7,620,628 | B2 | 11/2009 | Kapur et al. |
| 7,627,489 | B2 | 12/2009 | Schaeffer et al. |
| 7,627,812 | B2 | 12/2009 | Chamberlain et al. |
| 7,630,931 | B1 | 12/2009 | Rachev et al. |
| 7,634,717 | B2 | 12/2009 | Chamberlain et al. |
| 7,640,173 | B2 | 12/2009 | Surpin et al. |
| 7,657,478 | B2 | 2/2010 | De Diego |
| 7,685,042 | B1 | 3/2010 | Monroe et al. |
| 7,685,083 | B2 | 3/2010 | Fairweather |
| 7,703,021 | B1 | 4/2010 | Flam |
| 7,706,817 | B2 | 4/2010 | Bamrah et al. |
| 7,712,049 | B2 | 5/2010 | Williams et al. |
| 7,716,067 | B2 | 5/2010 | Surpin et al. |
| 7,716,077 | B1 | 5/2010 | Mikurak |
| 7,716,227 | B1 | 5/2010 | Hao et al. |
| 7,725,530 | B2 | 5/2010 | Sah et al. |
| 7,725,547 | B2 | 5/2010 | Albertson et al. |
| 7,725,728 | B2 | 5/2010 | Ama et al. |
| 7,730,082 | B2 | 6/2010 | Sah et al. |
| 7,730,109 | B2 | 6/2010 | Rohrs et al. |
| 7,756,843 | B1 | 7/2010 | Palmer |
| 7,757,220 | B2 | 7/2010 | Griffith et al. |
| 7,770,100 | B2 | 8/2010 | Chamberlain et al. |
| 7,783,679 | B2 | 8/2010 | Bley |
| 7,805,457 | B1 | 9/2010 | Viola et al. |
| 7,809,703 | B2 | 10/2010 | Balabhadrapatruni et al. |
| 7,818,291 | B2 | 10/2010 | Ferguson et al. |
| 7,818,658 | B2 | 10/2010 | Chen |
| 7,835,966 | B2 | 11/2010 | Satchwell |
| 7,848,995 | B2 | 12/2010 | Dalal |
| 7,853,573 | B2 | 12/2010 | Warner et al. |
| 7,870,493 | B2 | 1/2011 | Pall et al. |
| 7,877,421 | B2 | 1/2011 | Berger et al. |
| 7,880,921 | B2 | 2/2011 | Dattilo et al. |
| 7,894,984 | B2 | 2/2011 | Rasmussen et al. |
| 7,899,611 | B2 | 3/2011 | Downs et al. |
| 7,904,913 | B2 | 3/2011 | Sim-Tang et al. |
| 7,908,521 | B2 | 3/2011 | Sridharan et al. |
| 7,912,842 | B1 | 3/2011 | Bayliss |
| 7,917,376 | B2 | 3/2011 | Bellin et al. |
| 7,920,963 | B2 | 4/2011 | Jouline et al. |
| 7,933,862 | B2 | 4/2011 | Chamberlain et al. |
| 7,941,321 | B2 | 5/2011 | Greenstein et al. |
| 7,958,147 | B1 | 6/2011 | Turner et al. |
| 7,962,281 | B2 | 6/2011 | Rasmussen et al. |
| 7,962,495 | B2 | 6/2011 | Jain et al. |
| 7,962,848 | B2 | 6/2011 | Bertram |
| 7,970,240 | B1 | 6/2011 | Chao et al. |
| 7,971,150 | B2 | 6/2011 | Raskutti et al. |
| 7,984,374 | B2 | 6/2011 | Caro et al. |
| 7,979,424 | B2 | 7/2011 | Dettinger et al. |
| 8,001,465 | B2 | 8/2011 | Kudrolli et al. |
| 8,001,482 | B2 | 8/2011 | Bhattiprolu et al. |
| 8,010,507 | B2 | 8/2011 | Poston et al. |
| 8,010,545 | B2 | 8/2011 | Stefik et al. |
| 8,015,487 | B2 | 9/2011 | Roy et al. |
| 8,024,778 | B2 | 9/2011 | Cash et al. |
| 8,036,632 | B1 | 10/2011 | Cona et al. |
| 8,036,971 | B2 | 10/2011 | Aymeloglu et al. |
| 8,041,714 | B2 | 10/2011 | Aymeloglu et al. |
| 8,042,110 | B1 | 10/2011 | Kawahara et al. |
| 8,046,283 | B2 | 10/2011 | Burns |
| 8,054,756 | B2 | 11/2011 | Chand et al. |
| 8,060,421 | B1 | 11/2011 | Wang |
| 8,065,606 | B1 | 11/2011 | Gralnick et al. |
| 8,073,857 | B2 | 12/2011 | Sreekanth |
| 8,082,172 | B2 | 12/2011 | Chao et al. |
| 8,103,543 | B1 | 1/2012 | Zwicky |
| 8,103,962 | B2 | 1/2012 | Embley et al. |
| 8,108,138 | B2 | 1/2012 | Bruce et al. |
| 8,112,425 | B2 | 2/2012 | Baum et al. |
| 8,117,022 | B2 | 2/2012 | Linker |
| 8,126,848 | B2 | 2/2012 | Wagner |
| 8,134,457 | B2 | 3/2012 | Velipasalar et al. |
| 8,145,703 | B2 | 3/2012 | Frishert et al. |
| 8,185,819 | B2 | 5/2012 | Sah et al. |
| 8,214,361 | B1 | 7/2012 | Sandler et al. |
| 8,214,490 | B1 | 7/2012 | Vos et al. |
| 8,214,764 | B2 | 7/2012 | Gemmell et al. |
| 8,225,201 | B2 | 7/2012 | Michael |
| 8,229,902 | B2 | 7/2012 | Vishniac et al. |
| 8,229,947 | B2 | 7/2012 | Fujinaga |
| 8,230,333 | B2 | 7/2012 | Decherd et al. |
| 8,271,461 | B2 | 9/2012 | Pike et al. |
| 8,280,880 | B1 | 10/2012 | Aymeloglu et al. |
| 8,290,838 | B1 | 10/2012 | Thakur et al. |
| 8,290,926 | B2 | 10/2012 | Ozzie et al. |
| 8,290,942 | B2 | 10/2012 | Jones et al. |
| 8,301,464 | B1 | 10/2012 | Cave et al. |
| 8,301,904 | B1 | 10/2012 | Gryaznov |
| 8,302,855 | B2 | 11/2012 | Ma et al. |
| 8,312,367 | B2 | 11/2012 | Foster |
| 8,312,546 | B2 | 11/2012 | Alme |
| 8,326,727 | B2 | 12/2012 | Aymeloglu et al. |
| 8,352,174 | B2 | 1/2013 | Milstein et al. |
| 8,352,881 | B2 | 1/2013 | Champion et al. |
| 8,364,642 | B1 | 1/2013 | Garrod |
| 8,368,695 | B2 | 2/2013 | Howell et al. |
| 8,397,171 | B2 | 3/2013 | Klassen et al. |
| 8,412,707 | B1 | 4/2013 | Mianji |
| 8,417,409 | B2 | 4/2013 | Bast et al. |
| 8,417,715 | B1 | 4/2013 | Bruckhaus et al. |
| 8,429,194 | B2 | 4/2013 | Aymeloglu et al. |
| 8,429,527 | B1 | 4/2013 | Arbogast |
| 8,433,702 | B1 | 4/2013 | Carrino et al. |
| 8,433,703 | B1 | 4/2013 | Schneider et al. |
| 8,447,722 | B1 | 5/2013 | Ahuja et al. |
| 8,452,790 | B1 | 5/2013 | Mianji |
| 8,463,036 | B1 | 6/2013 | Ramesh et al. |
| 8,473,454 | B2 | 6/2013 | Evanitsky et al. |
| 8,484,115 | B2 | 7/2013 | Aymeloglu et al. |

(56) References Cited

U.S. PATENT DOCUMENTS

| | | |
|---|---|---|
| 8,484,549 B2 | 7/2013 | Burr et al. |
| 8,489,331 B2 | 7/2013 | Kopf et al. |
| 8,489,641 B1 | 7/2013 | Seefeld et al. |
| 8,494,941 B2 | 7/2013 | Aymeloglu et al. |
| 8,498,984 B1 | 7/2013 | Hwang et al. |
| 8,499,287 B2 | 7/2013 | Shafi et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,554,719 B2 | 10/2013 | McGrew |
| 8,560,413 B1 | 10/2013 | Quarterman |
| 8,560,494 B1 | 10/2013 | Downing |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,600,872 B1 | 12/2013 | Yan |
| 8,601,326 B1 | 12/2013 | Kirn |
| 8,620,641 B2 | 12/2013 | Farnsworth et al. |
| 8,639,552 B1 | 1/2014 | Chen et al. |
| 8,639,757 B1 | 1/2014 | Zang et al. |
| 8,645,332 B1 | 2/2014 | Cohen et al. |
| 8,646,080 B2 | 2/2014 | Williamson et al. |
| 8,666,861 B2 | 3/2014 | Li et al. |
| 8,676,857 B1 | 3/2014 | Adams et al. |
| 8,688,573 B1 | 4/2014 | Ruknoic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,732,574 B2 | 5/2014 | Burr et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,763,078 B1 | 6/2014 | Castellucci et al. |
| 8,781,169 B2 | 7/2014 | Jackson et al. |
| 8,786,605 B1 | 7/2014 | Curtis et al. |
| 8,787,939 B2 | 7/2014 | Papakipos et al. |
| 8,788,407 B1 | 7/2014 | Singh et al. |
| 8,798,354 B1 | 8/2014 | Bunzel et al. |
| 8,799,799 B1 | 8/2014 | Cervelli et al. |
| 8,799,867 B1 | 8/2014 | Peri-Glass et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,903,717 B2 | 12/2014 | Elliot |
| 8,909,597 B2 | 12/2014 | Aymeloglu et al. |
| 8,909,656 B2 | 12/2014 | Kumar et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,429 B1 | 12/2014 | Fisher et al. |
| 8,924,872 B1 | 12/2014 | Bogomolov et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 8,949,164 B1 | 2/2015 | Mohler |
| 8,984,390 B2 | 3/2015 | Aymeloglu et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,031,981 B1 | 5/2015 | Potter et al. |
| 9,032,531 B1 | 5/2015 | Scorvo et al. |
| 9,043,696 B1 | 5/2015 | Meiklejohn et al. |
| 9,043,894 B1 | 5/2015 | Dennison et al. |
| 9,092,482 B2 | 7/2015 | Harris et al. |
| 9,100,428 B1 | 8/2015 | Visbal |
| 9,105,000 B1 | 8/2015 | White et al. |
| 9,116,975 B2 | 8/2015 | Shankar et al. |
| 9,129,219 B1 | 9/2015 | Robertson et al. |
| 9,229,966 B2 | 1/2016 | Aymeloglu et al. |
| 9,280,532 B2 | 3/2016 | Cicerone |
| 9,292,388 B2 | 3/2016 | Fisher et al. |
| 9,330,120 B2 | 5/2016 | Colgrove et al. |
| 9,348,677 B2 | 5/2016 | Marinelli, III et al. |
| 9,367,463 B2 | 6/2016 | Biswal et al. |
| 9,449,074 B1 | 9/2016 | Fisher et al. |
| 2001/0011243 A1 | 8/2001 | Dembo et al. |
| 2001/0021936 A1 | 9/2001 | Bertram |
| 2001/0027424 A1 | 10/2001 | Torigoe |
| 2002/0007329 A1 | 1/2002 | Alcaly et al. |
| 2002/0007331 A1 | 1/2002 | Lo et al. |
| 2002/0026404 A1 | 2/2002 | Thompson |
| 2002/0030701 A1 | 3/2002 | Knight |
| 2002/0032677 A1 | 3/2002 | Morgenthaler et al. |
| 2002/0033848 A1 | 3/2002 | Sciammarella et al. |
| 2002/0035590 A1 | 3/2002 | Eibach et al. |
| 2002/0040336 A1 | 4/2002 | Blanchard et al. |
| 2002/0059126 A1 | 5/2002 | Ricciardi |
| 2002/0065708 A1 | 5/2002 | Senay et al. |
| 2002/0087570 A1 | 7/2002 | Jacquez et al. |
| 2002/0091707 A1 | 7/2002 | Keller |
| 2002/0095360 A1 | 7/2002 | Joao |
| 2002/0095658 A1 | 7/2002 | Shulman |
| 2002/0099870 A1 | 7/2002 | Miller et al. |
| 2002/0103705 A1 | 8/2002 | Brady |
| 2002/0116120 A1 | 8/2002 | Ruiz et al. |
| 2002/0130907 A1 | 9/2002 | Chi et al. |
| 2002/0138383 A1 | 9/2002 | Rhee |
| 2002/0147671 A1 | 10/2002 | Sloan et al. |
| 2002/0156812 A1 | 10/2002 | Krasnoiarov et al. |
| 2002/0174201 A1 | 11/2002 | Ramer et al. |
| 2002/0184111 A1 | 12/2002 | Swanson |
| 2002/0194119 A1 | 12/2002 | Wright et al. |
| 2003/0004770 A1 | 1/2003 | Miller et al. |
| 2003/0009392 A1 | 1/2003 | Perkowski |
| 2003/0009399 A1 | 1/2003 | Boerner |
| 2003/0023620 A1 | 1/2003 | Trotta |
| 2003/0028560 A1 | 2/2003 | Kudrolli et al. |
| 2003/0039948 A1 | 2/2003 | Donahue |
| 2003/0065605 A1 | 4/2003 | Gatto |
| 2003/0065606 A1 | 4/2003 | Satchwell |
| 2003/0065607 A1 | 4/2003 | Satchwell |
| 2003/0078827 A1 | 4/2003 | Hoffman |
| 2003/0093401 A1 | 5/2003 | Czahkowski et al. |
| 2003/0093755 A1 | 5/2003 | O'Carroll |
| 2003/0105759 A1 | 6/2003 | Bess et al. |
| 2003/0105833 A1 | 6/2003 | Daniels |
| 2003/0115481 A1 | 6/2003 | Baird et al. |
| 2003/0126102 A1 | 7/2003 | Borthwick |
| 2003/0130996 A1 | 7/2003 | Bayerl et al. |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0167423 A1 | 9/2003 | Murakami et al. |
| 2003/0172021 A1 | 9/2003 | Huang |
| 2003/0172053 A1 | 9/2003 | Fairweather |
| 2003/0177112 A1 | 9/2003 | Gardner |
| 2003/0182177 A1 | 9/2003 | Gallagher |
| 2003/0182313 A1 | 9/2003 | Federwisch et al. |
| 2003/0184588 A1 | 10/2003 | Lee |
| 2003/0187761 A1 | 10/2003 | Olsen et al. |
| 2003/0200217 A1 | 10/2003 | Ackerman |
| 2003/0212670 A1 | 11/2003 | Yalamanchi et al. |
| 2003/0212718 A1 | 11/2003 | Tester |
| 2003/0225755 A1 | 12/2003 | Iwayama et al. |
| 2003/0229848 A1 | 12/2003 | Arend et al. |
| 2004/0003009 A1 | 1/2004 | Wilmot |
| 2004/0006523 A1 | 1/2004 | Coker |
| 2004/0032432 A1 | 2/2004 | Baynger |
| 2004/0034570 A1 | 2/2004 | Davis |
| 2004/0044648 A1 | 3/2004 | Anfindsen et al. |
| 2004/0064256 A1 | 4/2004 | Barinek et al. |
| 2004/0083466 A1 | 4/2004 | Dapp et al. |
| 2004/0085318 A1 | 5/2004 | Hassler et al. |
| 2004/0088177 A1 | 5/2004 | Travis et al. |
| 2004/0095349 A1 | 5/2004 | Bito et al. |
| 2004/0098731 A1 | 5/2004 | Demsey et al. |
| 2004/0103088 A1 | 5/2004 | Cragun et al. |
| 2004/0103124 A1 | 5/2004 | Kupkova |

(56) References Cited

U.S. PATENT DOCUMENTS

| | | |
|---|---|---|
| 2004/0111410 A1 | 6/2004 | Burgoon et al. |
| 2004/0111480 A1 | 6/2004 | Yue |
| 2004/0117387 A1 | 6/2004 | Civetta et al. |
| 2004/0126840 A1 | 7/2004 | Cheng et al. |
| 2004/0133500 A1 | 7/2004 | Thompson et al. |
| 2004/0139212 A1 | 7/2004 | Mukherjee et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0153451 A1 | 8/2004 | Phillips et al. |
| 2004/0153837 A1 | 8/2004 | Preston et al. |
| 2004/0163039 A1 | 8/2004 | Gorman |
| 2004/0181554 A1 | 9/2004 | Heckerman et al. |
| 2004/0193599 A1 | 9/2004 | Liu et al. |
| 2004/0193600 A1 | 9/2004 | Kaasten et al. |
| 2004/0193608 A1 | 9/2004 | Gollapudi et al. |
| 2004/0205492 A1 | 10/2004 | Newsome |
| 2004/0210763 A1 | 10/2004 | Jonas |
| 2004/0221223 A1 | 11/2004 | Yu et al. |
| 2004/0236688 A1 | 11/2004 | Bozeman |
| 2004/0254658 A1 | 12/2004 | Sherriff et al. |
| 2004/0260702 A1 | 12/2004 | Cragun et al. |
| 2004/0267746 A1 | 12/2004 | Marcjan et al. |
| 2005/0004911 A1 | 1/2005 | Goldberg et al. |
| 2005/0010472 A1 | 1/2005 | Quatse et al. |
| 2005/0021397 A1 | 1/2005 | Cui et al. |
| 2005/0021877 A1 | 1/2005 | Varpela et al. |
| 2005/0027632 A1 | 2/2005 | Zeitoun et al. |
| 2005/0027705 A1 | 2/2005 | Sadri et al. |
| 2005/0028094 A1 | 2/2005 | Allyn |
| 2005/0039116 A1 | 2/2005 | Slack-Smith |
| 2005/0039119 A1 | 2/2005 | Parks et al. |
| 2005/0060712 A1 | 3/2005 | Miller et al. |
| 2005/0060713 A1 | 3/2005 | Miller et al. |
| 2005/0065811 A1 | 3/2005 | Chu et al. |
| 2005/0075962 A1 | 4/2005 | Dunne |
| 2005/0075966 A1 | 4/2005 | Duka |
| 2005/0080769 A1 | 4/2005 | Gemmell |
| 2005/0086207 A1 | 4/2005 | Heuer et al. |
| 2005/0090911 A1 | 4/2005 | Ingargiola et al. |
| 2005/0091186 A1 | 4/2005 | Elish |
| 2005/0097441 A1 | 5/2005 | Herbach et al. |
| 2005/0108001 A1 | 5/2005 | Aarskog |
| 2005/0120080 A1 | 6/2005 | Weinreb et al. |
| 2005/0125715 A1 | 6/2005 | Di Franco et al. |
| 2005/0131935 A1 | 6/2005 | O'Leary et al. |
| 2005/0133588 A1 | 6/2005 | Williams |
| 2005/0149455 A1 | 7/2005 | Bruesewitz et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0171881 A1 | 8/2005 | Ghassemieh et al. |
| 2005/0180330 A1 | 8/2005 | Shapiro |
| 2005/0182709 A1 | 8/2005 | Belcsak et al. |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0226473 A1 | 10/2005 | Ramesh |
| 2005/0246327 A1 | 11/2005 | Yeung et al. |
| 2005/0251786 A1 | 11/2005 | Citron et al. |
| 2005/0256703 A1 | 11/2005 | Markel |
| 2005/0262004 A1 | 11/2005 | Sakata et al. |
| 2005/0262057 A1 | 11/2005 | Lesh et al. |
| 2005/0262493 A1 | 11/2005 | Schmidt et al. |
| 2005/0262512 A1 | 11/2005 | Schmidt et al. |
| 2005/0278286 A1 | 12/2005 | Djugash et al. |
| 2006/0004740 A1 | 1/2006 | Dettinger et al. |
| 2006/0010130 A1 | 1/2006 | Leff et al. |
| 2006/0020398 A1 | 1/2006 | Vernon et al. |
| 2006/0026120 A1 | 2/2006 | Carolan et al. |
| 2006/0026170 A1 | 2/2006 | Kreitler et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0047590 A1 | 3/2006 | Anderson et al. |
| 2006/0052984 A1 | 3/2006 | Nakadate et al. |
| 2006/0053097 A1 | 3/2006 | King et al. |
| 2006/0053170 A1 | 3/2006 | Hill et al. |
| 2006/0059072 A1 | 3/2006 | Boglaev |
| 2006/0059139 A1 | 3/2006 | Robinson |
| 2006/0059423 A1 | 3/2006 | Lehmann et al. |
| 2006/0064181 A1 | 3/2006 | Kato |
| 2006/0070046 A1 | 3/2006 | Balakrishnan et al. |
| 2006/0074730 A1 | 4/2006 | Shukla et al. |
| 2006/0074866 A1 | 4/2006 | Chamberlain et al. |
| 2006/0074881 A1 | 4/2006 | Vembu et al. |
| 2006/0074967 A1 | 4/2006 | Shaburov |
| 2006/0080316 A1 | 4/2006 | Gilmore et al. |
| 2006/0080616 A1 | 4/2006 | Vogel et al. |
| 2006/0080619 A1 | 4/2006 | Carlson et al. |
| 2006/0093222 A1 | 5/2006 | Saffer et al. |
| 2006/0116943 A1 | 6/2006 | Willain |
| 2006/0116991 A1 | 6/2006 | Calderwood |
| 2006/0129746 A1 | 6/2006 | Porter |
| 2006/0129992 A1 | 6/2006 | Oberholtzer et al. |
| 2006/0136513 A1 | 6/2006 | Ngo et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0155654 A1 | 7/2006 | Plessis et al. |
| 2006/0203337 A1 | 9/2006 | White |
| 2006/0209085 A1 | 9/2006 | Wong et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0218637 A1 | 9/2006 | Thomas et al. |
| 2006/0224356 A1 | 10/2006 | Castelli et al. |
| 2006/0235786 A1 | 10/2006 | DiSalvo |
| 2006/0241856 A1 | 10/2006 | Cobleigh et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0253502 A1 | 11/2006 | Raman et al. |
| 2006/0265311 A1 | 11/2006 | Dean et al. |
| 2006/0265397 A1 | 11/2006 | Bryan et al. |
| 2006/0265417 A1 | 11/2006 | Amato et al. |
| 2006/0271277 A1 | 11/2006 | Hu et al. |
| 2006/0271884 A1 | 11/2006 | Hurst |
| 2006/0277460 A1 | 12/2006 | Forstall et al. |
| 2006/0279630 A1 | 12/2006 | Aggarwal et al. |
| 2006/0288046 A1 | 12/2006 | Gupta et al. |
| 2007/0000999 A1 | 1/2007 | Kubo et al. |
| 2007/0005582 A1 | 1/2007 | Navratil et al. |
| 2007/0011150 A1 | 1/2007 | Frank |
| 2007/0011304 A1 | 1/2007 | Error |
| 2007/0016363 A1 | 1/2007 | Huang et al. |
| 2007/0027851 A1 | 2/2007 | Kruy et al. |
| 2007/0038646 A1 | 2/2007 | Thota |
| 2007/0038962 A1 | 2/2007 | Fuchs et al. |
| 2007/0043686 A1 | 2/2007 | Teng et al. |
| 2007/0055598 A1 | 3/2007 | Arnott et al. |
| 2007/0055599 A1 | 3/2007 | Arnott |
| 2007/0057966 A1 | 3/2007 | Ohno et al. |
| 2007/0061259 A1 | 3/2007 | Zoldi et al. |
| 2007/0061752 A1 | 3/2007 | Cory |
| 2007/0067233 A1 | 3/2007 | Dalal |
| 2007/0067285 A1 | 3/2007 | Blume |
| 2007/0078832 A1 | 4/2007 | Ott et al. |
| 2007/0083541 A1 | 4/2007 | Fraleigh et al. |
| 2007/0088596 A1 | 4/2007 | Berkelhamer et al. |
| 2007/0091868 A1 | 4/2007 | Hollman et al. |
| 2007/0094248 A1 | 4/2007 | McVeigh et al. |
| 2007/0094312 A1 | 4/2007 | Sim-Tang |
| 2007/0094389 A1 | 4/2007 | Nussey et al. |
| 2007/0106582 A1 | 5/2007 | Baker et al. |
| 2007/0112714 A1 | 5/2007 | Fairweather |
| 2007/0113164 A1 | 5/2007 | Hansen et al. |
| 2007/0118527 A1 | 5/2007 | Winje et al. |
| 2007/0136115 A1 | 6/2007 | Doganaksoy et al. |
| 2007/0150369 A1 | 6/2007 | Zivin |

(56) References Cited

U.S. PATENT DOCUMENTS

| | | |
|---|---|---|
| 2007/0150801 A1 | 6/2007 | Chidlovskii et al. |
| 2007/0150805 A1 | 6/2007 | Misovski |
| 2007/0156673 A1 | 7/2007 | Maga |
| 2007/0168269 A1 | 7/2007 | Chuo |
| 2007/0168270 A1 | 7/2007 | De Diego Arozamena et al. |
| 2007/0168336 A1 | 7/2007 | Ransil et al. |
| 2007/0168871 A1 | 7/2007 | Jenkins |
| 2007/0174760 A1 | 7/2007 | Chamberlain et al. |
| 2007/0178501 A1 | 8/2007 | Rabinowitz et al. |
| 2007/0185867 A1 | 8/2007 | Maga |
| 2007/0192265 A1 | 8/2007 | Chopin et al. |
| 2007/0192281 A1 | 8/2007 | Cradick et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0219882 A1 | 9/2007 | May |
| 2007/0220604 A1 | 9/2007 | Long |
| 2007/0226617 A1 | 9/2007 | Traub et al. |
| 2007/0233709 A1 | 10/2007 | Abnous |
| 2007/0233756 A1 | 10/2007 | D'Souza et al. |
| 2007/0239606 A1 | 10/2007 | Eisen |
| 2007/0240062 A1 | 10/2007 | Christena et al. |
| 2007/0245339 A1 | 10/2007 | Bauman et al. |
| 2007/0260582 A1 | 11/2007 | Liang |
| 2007/0266336 A1 | 11/2007 | Nojima et al. |
| 2007/0271317 A1 | 11/2007 | Carmel |
| 2007/0282951 A1 | 12/2007 | Selimis et al. |
| 2007/0284433 A1 | 12/2007 | Domenica et al. |
| 2007/0294643 A1 | 12/2007 | Kyle |
| 2007/0299697 A1 | 12/2007 | Friedlander et al. |
| 2008/0005063 A1 | 1/2008 | Seeds |
| 2008/0015920 A1 | 1/2008 | Fawls et al. |
| 2008/0016155 A1 | 1/2008 | Khalatian |
| 2008/0016216 A1 | 1/2008 | Worley et al. |
| 2008/0040250 A1 | 2/2008 | Salter |
| 2008/0040684 A1 | 2/2008 | Crump |
| 2008/0046481 A1 | 2/2008 | Gould et al. |
| 2008/0046803 A1 | 2/2008 | Beauchamp et al. |
| 2008/0051989 A1 | 2/2008 | Welsh |
| 2008/0052142 A1 | 2/2008 | Bailey et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0091693 A1 | 4/2008 | Murthy |
| 2008/0097816 A1 | 4/2008 | Freire et al. |
| 2008/0103798 A1 | 5/2008 | Domenikos et al. |
| 2008/0103996 A1 | 5/2008 | Forman et al. |
| 2008/0104019 A1 | 5/2008 | Nath |
| 2008/0104407 A1 | 5/2008 | Horne et al. |
| 2008/0109714 A1 | 5/2008 | Kumar et al. |
| 2008/0126344 A1 | 5/2008 | Hoffman et al. |
| 2008/0126951 A1 | 5/2008 | Sood et al. |
| 2008/0133310 A1 | 6/2008 | Kim et al. |
| 2008/0140387 A1 | 6/2008 | Linker |
| 2008/0140576 A1 | 6/2008 | Lewis et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0172607 A1 | 7/2008 | Baer |
| 2008/0177782 A1 | 7/2008 | Poston et al. |
| 2008/0183639 A1 | 7/2008 | DiSalvo |
| 2008/0195417 A1 | 8/2008 | Surpin et al. |
| 2008/0195608 A1 | 8/2008 | Clover |
| 2008/0195672 A1 | 8/2008 | Hamel et al. |
| 2008/0196016 A1 | 8/2008 | Todd |
| 2008/0201313 A1 | 8/2008 | Dettinger et al. |
| 2008/0208820 A1 | 8/2008 | Usey et al. |
| 2008/0215543 A1 | 9/2008 | Huang et al. |
| 2008/0215546 A1 | 9/2008 | Baum et al. |
| 2008/0222295 A1 | 9/2008 | Robinson et al. |
| 2008/0228467 A1 | 9/2008 | Womack et al. |
| 2008/0243711 A1 | 10/2008 | Aymeloglu et al. |
| 2008/0243799 A1 | 10/2008 | Rozich et al. |
| 2008/0249845 A1 | 10/2008 | Aronowich et al. |
| 2008/0249957 A1 | 10/2008 | Masuyama et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0267386 A1 | 10/2008 | Cooper |
| 2008/0270316 A1 | 10/2008 | Guidotti et al. |
| 2008/0271838 A1 | 11/2008 | Carro |
| 2008/0276167 A1 | 11/2008 | Michael |
| 2008/0278311 A1 | 11/2008 | Grange et al. |
| 2008/0281580 A1 | 11/2008 | Zabokritski |
| 2008/0288306 A1 | 11/2008 | MacIntyre et al. |
| 2008/0288471 A1 | 11/2008 | Wu et al. |
| 2008/0301042 A1 | 12/2008 | Patzer |
| 2008/0301559 A1 | 12/2008 | Martinsen et al. |
| 2008/0301643 A1 | 12/2008 | Appleton et al. |
| 2008/0313132 A1 | 12/2008 | Hao et al. |
| 2008/0313243 A1 | 12/2008 | Poston et al. |
| 2008/0313281 A1 | 12/2008 | Scheidl et al. |
| 2009/0002492 A1 | 1/2009 | Velipasalar et al. |
| 2009/0006150 A1 | 1/2009 | Prigge et al. |
| 2009/0006271 A1 | 1/2009 | Crowder |
| 2009/0007056 A1 | 1/2009 | Prigge et al. |
| 2009/0018996 A1 | 1/2009 | Hunt et al. |
| 2009/0027418 A1 | 1/2009 | Maru et al. |
| 2009/0030915 A1 | 1/2009 | Winter et al. |
| 2009/0031401 A1 | 1/2009 | Cudich et al. |
| 2009/0037912 A1 | 2/2009 | Stoitsev et al. |
| 2009/0043762 A1 | 2/2009 | Shiverick et al. |
| 2009/0055251 A1 | 2/2009 | Shah et al. |
| 2009/0055487 A1 | 2/2009 | Moraes et al. |
| 2009/0076845 A1 | 3/2009 | Bellin et al. |
| 2009/0083275 A1 | 3/2009 | Jacob et al. |
| 2009/0088964 A1 | 4/2009 | Schaaf et al. |
| 2009/0089651 A1 | 4/2009 | Herberger et al. |
| 2009/0094166 A1 | 4/2009 | Aymeloglu et al. |
| 2009/0094217 A1 | 4/2009 | Dettinger et al. |
| 2009/0106178 A1 | 4/2009 | Chu |
| 2009/0106242 A1 | 4/2009 | McGrew |
| 2009/0106308 A1 | 4/2009 | Killian et al. |
| 2009/0112678 A1 | 4/2009 | Luzardo |
| 2009/0112745 A1 | 4/2009 | Stefanescu |
| 2009/0112922 A1 | 4/2009 | Barinaga |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0138307 A1 | 5/2009 | Belcsak et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0144747 A1 | 6/2009 | Baker |
| 2009/0150868 A1 | 6/2009 | Chakra et al. |
| 2009/0161147 A1 | 6/2009 | Klave |
| 2009/0164387 A1 | 6/2009 | Armstrong et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172674 A1 | 7/2009 | Bobak et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0187556 A1 | 7/2009 | Ross et al. |
| 2009/0193012 A1 | 7/2009 | Williams |
| 2009/0193050 A1 | 7/2009 | Olson |
| 2009/0199047 A1 | 8/2009 | Vaitheeswaran et al. |
| 2009/0199106 A1 | 8/2009 | Jonsson et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0228365 A1 | 9/2009 | Tomchek et al. |
| 2009/0228507 A1 | 9/2009 | Jain et al. |
| 2009/0234720 A1 | 9/2009 | George et al. |
| 2009/0248721 A1 | 10/2009 | Burton et al. |

(56) References Cited

U.S. PATENT DOCUMENTS

| | | |
|---|---|---|
| 2009/0248757 A1 | 10/2009 | Havewala et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1 | 11/2009 | Oxford |
| 2009/0299830 A1 | 12/2009 | West et al. |
| 2009/0307049 A1 | 12/2009 | Elliott et al. |
| 2009/0313250 A1 | 12/2009 | Folting et al. |
| 2009/0313311 A1 | 12/2009 | Hoffmann et al. |
| 2009/0313463 A1 | 12/2009 | Pang et al. |
| 2009/0319418 A1 | 12/2009 | Herz |
| 2009/0319891 A1 | 12/2009 | MacKinlay |
| 2009/0319996 A1 | 12/2009 | Shafi et al. |
| 2009/0327157 A1 | 12/2009 | Dunne |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057600 A1 | 3/2010 | Johansen et al. |
| 2010/0057622 A1 | 3/2010 | Faith et al. |
| 2010/0057716 A1 | 3/2010 | Stefik et al. |
| 2010/0070426 A1 | 3/2010 | Aymeloglu et al. |
| 2010/0070427 A1 | 3/2010 | Aymeloglu et al. |
| 2010/0070464 A1 | 3/2010 | Aymeloglu et al. |
| 2010/0070489 A1 | 3/2010 | Aymeloglu et al. |
| 2010/0070523 A1 | 3/2010 | Delgo et al. |
| 2010/0070531 A1 | 3/2010 | Aymeloglu et al. |
| 2010/0070842 A1 | 3/2010 | Aymeloglu et al. |
| 2010/0070844 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0073315 A1 | 3/2010 | Lee et al. |
| 2010/0082541 A1 | 4/2010 | Kottomtharayil |
| 2010/0082671 A1 | 4/2010 | Li et al. |
| 2010/0094765 A1 | 4/2010 | Nandy |
| 2010/0098318 A1 | 4/2010 | Anderson |
| 2010/0100963 A1 | 4/2010 | Mahaffey |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0131502 A1 | 5/2010 | Fordham |
| 2010/0145902 A1 | 6/2010 | Boyan et al. |
| 2010/0145909 A1 | 6/2010 | Ngo |
| 2010/0161646 A1 | 6/2010 | Ceballos et al. |
| 2010/0161735 A1 | 6/2010 | Sharma |
| 2010/0162176 A1 | 6/2010 | Dunton |
| 2010/0162371 A1 | 6/2010 | Geil |
| 2010/0169192 A1 | 7/2010 | Zoldi et al. |
| 2010/0169376 A1 | 7/2010 | Chu |
| 2010/0169405 A1 | 7/2010 | Zhang |
| 2010/0191563 A1 | 7/2010 | Schlaifer et al. |
| 2010/0198684 A1 | 8/2010 | Eraker et al. |
| 2010/0199167 A1 | 8/2010 | Uematsu et al. |
| 2010/0199225 A1 | 8/2010 | Coleman et al. |
| 2010/0204983 A1 | 8/2010 | Chung et al. |
| 2010/0205108 A1 | 8/2010 | Mun |
| 2010/0205662 A1 | 8/2010 | Ibrahim et al. |
| 2010/0223260 A1 | 9/2010 | Wu |
| 2010/0228812 A1 | 9/2010 | Uomini |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0283787 A1 | 11/2010 | Hamedi et al. |
| 2010/0293174 A1 | 11/2010 | Bennett et al. |
| 2010/0306285 A1 | 12/2010 | Shah et al. |
| 2010/0306713 A1 | 12/2010 | Geisner et al. |
| 2010/0312530 A1 | 12/2010 | Capriotti |
| 2010/0312837 A1 | 12/2010 | Bodapati et al. |
| 2010/0313119 A1 | 12/2010 | Baldwin |
| 2010/0313239 A1 | 12/2010 | Chakra et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004626 A1 | 1/2011 | Naeymi-Rad et al. |
| 2011/0029526 A1 | 2/2011 | Knight et al. |
| 2011/0035396 A1 | 2/2011 | Merz et al. |
| 2011/0041084 A1 | 2/2011 | Karam |
| 2011/0047159 A1 | 2/2011 | Baid et al. |
| 2011/0055074 A1 | 3/2011 | Chen et al. |
| 2011/0060753 A1 | 3/2011 | Shaked et al. |
| 2011/0061013 A1 | 3/2011 | Bilicki et al. |
| 2011/0066497 A1 | 3/2011 | Gopinath et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0093490 A1 | 4/2011 | Schindlauer et al. |
| 2011/0099133 A1 | 4/2011 | Chang et al. |
| 2011/0099628 A1 | 4/2011 | Lanxner et al. |
| 2011/0117878 A1 | 5/2011 | Barash et al. |
| 2011/0119100 A1 | 5/2011 | Ruhl et al. |
| 2011/0131082 A1 | 6/2011 | Manser et al. |
| 2011/0131122 A1 | 6/2011 | Griffin et al. |
| 2011/0131547 A1 | 6/2011 | Elaasar |
| 2011/0137766 A1 | 6/2011 | Rasmussen et al. |
| 2011/0145401 A1 | 6/2011 | Westlake |
| 2011/0153384 A1 | 6/2011 | Horne et al. |
| 2011/0153592 A1 | 6/2011 | DeMarcken |
| 2011/0161096 A1 | 6/2011 | Buehler et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0179042 A1 | 7/2011 | Aymeloglu et al. |
| 2011/0185316 A1 | 7/2011 | Reid et al. |
| 2011/0185401 A1 | 7/2011 | Bak et al. |
| 2011/0208565 A1 | 8/2011 | Ross et al. |
| 2011/0208724 A1 | 8/2011 | Jones et al. |
| 2011/0208822 A1 | 8/2011 | Rathod |
| 2011/0213655 A1 | 9/2011 | Henkin |
| 2011/0218934 A1 | 9/2011 | Elser |
| 2011/0218955 A1 | 9/2011 | Tang |
| 2011/0219450 A1 | 9/2011 | McDougal et al. |
| 2011/0225198 A1 | 9/2011 | Edwards et al. |
| 2011/0225482 A1 | 9/2011 | Chan et al. |
| 2011/0225586 A1 | 9/2011 | Bentley et al. |
| 2011/0231305 A1 | 9/2011 | Winters |
| 2011/0238495 A1 | 9/2011 | Kang |
| 2011/0251951 A1 | 10/2011 | Kolkowitz |
| 2011/0252282 A1 | 10/2011 | Meek et al. |
| 2011/0258072 A1 | 10/2011 | Kerker et al. |
| 2011/0258158 A1 | 10/2011 | Resende et al. |
| 2011/0258216 A1 | 10/2011 | Supakkul et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0270871 A1 | 11/2011 | He et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2011/0321008 A1 | 12/2011 | Jhoney et al. |
| 2012/0011238 A1 | 1/2012 | Rathod |
| 2012/0011245 A1 | 1/2012 | Gillette et al. |
| 2012/0013684 A1 | 1/2012 | Robertson et al. |
| 2012/0019559 A1 | 1/2012 | Siler et al. |
| 2012/0022945 A1 | 1/2012 | Falkenborg et al. |
| 2012/0030140 A1 | 2/2012 | Aymeloglu et al. |
| 2012/0036013 A1 | 2/2012 | Neuhaus et al. |
| 2012/0036434 A1 | 2/2012 | Oberstein |

(56) References Cited

U.S. PATENT DOCUMENTS

| | | |
|---|---|---|
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0078595 A1 | 3/2012 | Balandin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084287 A1 | 4/2012 | Lakshminarayan et al. |
| 2012/0101952 A1 | 4/2012 | Raleigh et al. |
| 2012/0102022 A1 | 4/2012 | Miranker et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0136804 A1 | 5/2012 | Lucia |
| 2012/0137235 A1 | 5/2012 | TS et al. |
| 2012/0143816 A1 | 6/2012 | Zhang et al. |
| 2012/0144335 A1 | 6/2012 | Abeln et al. |
| 2012/0158585 A1 | 6/2012 | Ganti |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0159449 A1 | 6/2012 | Arnold et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0174057 A1 | 7/2012 | Narendra et al. |
| 2012/0180002 A1 | 7/2012 | Campbell et al. |
| 2012/0188252 A1 | 7/2012 | Law |
| 2012/0191446 A1 | 7/2012 | Binsztok et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0278249 A1 | 11/2012 | Duggal et al. |
| 2012/0284345 A1 | 11/2012 | Costenaro et al. |
| 2012/0284719 A1 | 11/2012 | Phan et al. |
| 2012/0290506 A1 | 11/2012 | Muramatsu et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0024731 A1 | 1/2013 | Shochat et al. |
| 2013/0036346 A1 | 2/2013 | Cicerone |
| 2013/0046635 A1 | 2/2013 | Grigg et al. |
| 2013/0046842 A1 | 2/2013 | Muntz et al. |
| 2013/0054306 A1 | 2/2013 | Bhalla |
| 2013/0054551 A1 | 2/2013 | Lange |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0096968 A1 | 4/2013 | Van Pelt et al. |
| 2013/0096988 A1 | 4/2013 | Grossman et al. |
| 2013/0097130 A1 | 4/2013 | Bingol et al. |
| 2013/0097482 A1 | 4/2013 | Marantz et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0124193 A1 | 5/2013 | Holmberg |
| 2013/0132348 A1 | 5/2013 | Garrod |
| 2013/0101159 A1 | 6/2013 | Chao et al. |
| 2013/0150004 A1 | 6/2013 | Rosen |
| 2013/0151148 A1 | 6/2013 | Parundekar et al. |
| 2013/0151305 A1 | 6/2013 | Akinola et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0198624 A1 | 8/2013 | Aymeloglu et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226944 A1 | 8/2013 | Baid et al. |
| 2013/0226953 A1 | 8/2013 | Markovich et al. |
| 2013/0231862 A1 | 9/2013 | Delling et al. |
| 2013/0232045 A1 | 9/2013 | Tai et al. |
| 2013/0232220 A1 | 9/2013 | Sampson |
| 2013/0238616 A1 | 9/2013 | Rose et al. |
| 2013/0238664 A1 | 9/2013 | Hsu et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0251233 A1 | 9/2013 | Yang et al. |
| 2013/0262328 A1 | 10/2013 | Federgreen |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290161 A1 | 10/2013 | Aymeloglu et al. |
| 2013/0290825 A1 | 10/2013 | Arndt et al. |
| 2013/0293553 A1 | 11/2013 | Burr et al. |
| 2013/0297619 A1 | 11/2013 | Chandrasekaran et al. |
| 2013/0304770 A1 | 11/2013 | Boero et al. |
| 2013/0311375 A1 | 11/2013 | Priebatsch |
| 2013/0325826 A1 | 12/2013 | Agarwal et al. |
| 2014/0006404 A1 | 1/2014 | McGrew et al. |
| 2014/0012724 A1 | 1/2014 | O'Leary et al. |
| 2014/0012796 A1 | 1/2014 | Petersen et al. |
| 2014/0012886 A1 | 1/2014 | Downing et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058914 A1 | 2/2014 | Song et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0074888 A1 | 3/2014 | Potter et al. |
| 2014/0081685 A1 | 3/2014 | Thacker et al. |
| 2014/0095273 A1 | 4/2014 | Tang et al. |
| 2014/0095363 A1 | 4/2014 | Caldwell |
| 2014/0095509 A1 | 4/2014 | Patton |
| 2014/0108068 A1 | 4/2014 | Williams |
| 2014/0108074 A1 | 4/2014 | Miller et al. |
| 2014/0108380 A1 | 4/2014 | Gotz et al. |
| 2014/0108985 A1 | 4/2014 | Scott et al. |
| 2014/0115589 A1 | 4/2014 | Marinelli, III et al. |

(56) References Cited

U.S. PATENT DOCUMENTS

| | | |
|---|---|---|
| 2014/0115610 A1 | 4/2014 | Marinelli, III et al. |
| 2014/0120864 A1 | 5/2014 | Manolarakis et al. |
| 2014/0123279 A1 | 5/2014 | Bishop et al. |
| 2014/0129261 A1 | 5/2014 | Bothwell et al. |
| 2014/0129936 A1 | 5/2014 | Richards et al. |
| 2014/0136285 A1 | 5/2014 | Carvalho |
| 2014/0143009 A1 | 5/2014 | Brice et al. |
| 2014/0143025 A1 | 5/2014 | Fish et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0181833 A1 | 6/2014 | Bird et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214482 A1* | 7/2014 | Williams ............... G06Q 30/00 705/7.29 |
| 2014/0214579 A1 | 7/2014 | Shen et al. |
| 2014/0222521 A1 | 8/2014 | Chait |
| 2014/0222752 A1 | 8/2014 | Isman et al. |
| 2014/0222793 A1 | 8/2014 | Sadkin et al. |
| 2014/0229554 A1 | 8/2014 | Grunin et al. |
| 2014/0237354 A1 | 8/2014 | Burr et al. |
| 2014/0244388 A1 | 8/2014 | Manouchehri et al. |
| 2014/0267294 A1 | 9/2014 | Ma |
| 2014/0267295 A1 | 9/2014 | Sharma |
| 2014/0279824 A1 | 9/2014 | Tamayo |
| 2014/0279865 A1 | 9/2014 | Kumar |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0358789 A1 | 12/2014 | Boding et al. |
| 2014/0358829 A1 | 12/2014 | Hurwitz |
| 2014/0366132 A1 | 12/2014 | Stiansen et al. |
| 2015/0012509 A1 | 1/2015 | Kirn |
| 2015/0019394 A1 | 1/2015 | Unser et al. |
| 2015/0046481 A1 | 2/2015 | Elliot |
| 2015/0046870 A1 | 2/2015 | Goldenberg et al. |
| 2015/0073929 A1 | 3/2015 | Psota et al. |
| 2015/0073954 A1 | 3/2015 | Braff |
| 2015/0089424 A1 | 3/2015 | Duffield et al. |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0112641 A1 | 4/2015 | Faraj |
| 2015/0120176 A1 | 4/2015 | Curtis et al. |
| 2015/0134512 A1 | 5/2015 | Mueller |
| 2015/0134666 A1 | 5/2015 | Gattiker et al. |
| 2015/0135256 A1 | 5/2015 | Hoy et al. |
| 2015/0161611 A1 | 6/2015 | Duke et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178743 A1 | 6/2015 | Aymeloglu et al. |
| 2015/0178825 A1 | 6/2015 | Huerta |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0188872 A1 | 7/2015 | White |
| 2015/0205848 A1 | 7/2015 | Kumar et al. |
| 2015/0227295 A1 | 8/2015 | Meiklejohn et al. |
| 2015/0261817 A1 | 9/2015 | Harris et al. |
| 2015/0269030 A1 | 9/2015 | Fisher et al. |
| 2015/0309719 A1 | 10/2015 | Ma et al. |
| 2015/0310005 A1 | 10/2015 | Ryger et al. |
| 2015/0317342 A1 | 11/2015 | Grossman et al. |
| 2015/0324868 A1 | 11/2015 | Kaftan et al. |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0026923 A1 | 1/2016 | Erenrich et al. |
| 2016/0299652 A1 | 10/2016 | Aymeloglu et al. |

FOREIGN PATENT DOCUMENTS

| | | |
|---|---|---|
| CN | 102546446 | 7/2012 |
| CN | 103167093 | 6/2013 |
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014213036 | 1/2015 |
| DE | 102014215621 | 2/2015 |
| EP | 0652513 | 5/1995 |
| EP | 1109116 | 6/2001 |
| EP | 1146649 | 10/2001 |
| EP | 1647908 | 4/2006 |
| EP | 1672527 | 6/2006 |
| EP | 1926074 | 5/2008 |
| EP | 2350817 | 8/2011 |
| EP | 2487610 | 8/2012 |
| EP | 2551799 | 1/2013 |
| EP | 2555126 | 2/2013 |
| EP | 2560134 | 2/2013 |
| EP | 2562709 | 2/2013 |
| EP | 2634745 | 9/2013 |
| EP | 2743839 | 6/2014 |
| EP | 2778913 | 9/2014 |
| EP | 2778914 | 9/2014 |
| EP | 2778974 | 9/2014 |
| EP | 2778977 | 9/2014 |
| EP | 2778986 | 9/2014 |
| EP | 2779082 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2876587 | 5/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2911078 | 8/2015 |
| EP | 2911100 | 8/2015 |
| EP | 2921975 | 9/2015 |
| EP | 2940603 | 11/2015 |
| EP | 2940609 | 11/2015 |
| EP | 2963595 | 1/2016 |
| GB | 2366498 | 3/2002 |
| GB | 2508503 | 6/2014 |
| GB | 2513472 | 10/2014 |
| GB | 2513721 | 11/2014 |
| GB | 2516155 | 1/2015 |
| GB | 2517582 | 2/2015 |
| GB | 2508293 | 4/2015 |
| GB | 2518745 | 4/2015 |
| HK | 1194178 | 9/2015 |
| NL | 2012778 | 11/2014 |
| NL | 2013134 | 1/2015 |
| NL | 2013306 | 2/2015 |
| NZ | 624557 | 12/2014 |
| NZ | 622485 | 3/2015 |
| NZ | 616212 | 5/2015 |
| NZ | 616299 | 7/2015 |
| WO | WO 2000/009529 | 2/2000 |
| WO | WO 00/034895 | 6/2000 |
| WO | WO 01/025906 | 4/2001 |
| WO | WO 2001/088750 | 11/2001 |
| WO | WO 2002/065353 | 8/2002 |
| WO | WO 2005/104736 | 11/2005 |

(56) References Cited

FOREIGN PATENT DOCUMENTS

| WO | WO 2005/116851 | 12/2005 |
|---|---|---|
| WO | WO 2008/064207 | 5/2008 |
| WO | WO 2008/121499 | 10/2008 |
| WO | WO 2009/042548 | 4/2009 |
| WO | WO 2009/051987 | 4/2009 |
| WO | WO 2009/061501 | 5/2009 |
| WO | WO 2010/000014 | 1/2010 |
| WO | WO 2010/030913 | 3/2010 |
| WO | WO 2010/030914 | 3/2010 |
| WO | WO 2010/030915 | 3/2010 |
| WO | WO 2010/030917 | 3/2010 |
| WO | WO 2010/030919 | 3/2010 |
| WO | WO 2010/030946 | 3/2010 |
| WO | WO 2010/030949 | 3/2010 |
| WO | WO 2012/025915 | 3/2012 |
| WO | WO 2012/119008 | 9/2012 |
| WO | WO 2013/010157 | 1/2013 |
| WO | WO 2013/030595 | 3/2013 |
| WO | WO 2013/102892 | 7/2013 |

OTHER PUBLICATIONS

"A Tour of Pinboard," http://pinboard.in/tour as printed May 15, 2014 in 6 pages.
"The FASTA Program Package," fasta-36.3.4, Mar. 25, 2011, pp. 29.
"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.
Alur et al., "Chapter 2: IBM InfoSphere DataStage Stages," IBM InfoSphere DataStage Data Flow and Job Design, Jul. 1, 2008, pp. 35-137.
Anonymous, "Frequently Asked Questions about Office Binder 97," http://web.archive/org/web/20100210112922/http://support.microsoft.com/kb/843147 printed Dec. 18, 2006 in 5 pages.
Bae et al., "Partitioning Algorithms for the Computation of Average Iceberg Queries," DaWaK 2000, LNCS 1874, pp. 276-286.
Ballesteros et al., "Batching: A Design Pattern for Efficient and Flexible Client/Server Interaction," Transactions on Pattern Languages of Programming, Springer Berlin Heidelberg, 2009, pp. 48-66.
Bogle et al., "Reducing Cross-Domain Call Overhead Using Batched Futures," SIGPLAN No. 29, 10 (Oct. 1994) pp. 341-354.
Bogle, Phillip Lee, "Reducing Cross-Domain Call Overhead Using Batched Futures," May 1994, Massachusetts Institute of Technology, pp. 96.
Bouajjani et al., "Analysis of Recursively Parallel Programs," PLDI09: Proceedings of the 2009 ACM Sigplan Conference on Programming Language Design and Implementation, Jan. 25-27, 2012, Dublin, Ireland, pp. 203-214.
Canese et al., "Chapter 2: PubMed: The Bibliographic Database," The NCBI Handbook, Oct. 2002, pp. 1-10.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Delcher et al., "Identifying Bacterial Genes and Endosymbiont DNA with Glimmer," BioInformatics, vol. 23, No. 6, 2007, pp. 673-679.
Delicious, http://delicious.com/ as printed May 15, 2014 in 1 page.
Donjerkovic et al., "Probabilistic Optimization of Top N Queries," Proceedings of the 25th VLDB Conference, Edinburgh, Scotland, 1999, pp. 411-422.
Fang et al., "Computing Iceberg Queries Efficiently," Proceedings of the 24th VLDB Conference, New York, 1998, pp. 299-310.
Fischer et al., "Populating a Release History Database from Version Control and Bug Tracking Systems", Proceedings of the International Conference on Software Maintenance, 2003 IEEE, pp. 10.

Goldstein et al., "Stacks Lazy Threads: Implementing a Fast Parallel Call," Journal of Parallel and Distributed Computing, Jan. 1, 1996, pp. 5-20.
Han et al., "Efficient Computation of Iceberg Cubes with Complex Measures," ACM Sigmod, May 21-24, 2001, pp. 1-12.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: http://www.codeproject.com/Articles/7335/An-extensible-math-expression-parser-with-plug-ins.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Kahan et al., "Annotea: An Open RDF Infrastructure for Shared WEB Annotations", Computer Networks, 2002, vol. 39, pp. 589-608.
Karp et al., "A Simple Algorithm for Finding Frequent Elements in Streams and Bags," ACM Transactions on Database Systems, vol. 28, No. 1, Mar. 2003, pp. 51-55.
Kitts, Paul, "Chapter 14: Genome Assembly and Annotation Process," The NCBI Handbook, Oct. 2002, pp. 1-21.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Mizrachi, Ilene, "Chapter 1: GenBank: The Nuckeotide Sequence Database," The NCBI Handbook, Oct. 2002, pp. 1-14.
Russell et al., "NITELIGHT: A Graphical Tool for Semantic Query Construction," 2008, pp. 10.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008), Acitrezza, Catania, Italy, Sep. 29-Oct. 3, 2008, pp. 16.
Stamos et al., "Remote Evaluation," Journal ACM Transactions on Programming Languages and Systems (TOPLAS) vol. 12, Issue 4, Oct. 1990, pp. 537-564.
Wikipedia, "Machine Code," printed Aug. 11, 2014, pp. 1-5.
Wollrath et al., "A Distributed Object Model for the Java System," Proceedings of the 2nd Conference on USENEX, Conference on Object-Oriented Technologies (COOTS), Jun. 17, 1996, pp. 219-231.
Notice of Acceptance for New Zealand Patent Application No. 616212 dated Jan. 23, 2015.
Notice of Acceptance for New Zealand Patent Application No. 616299 dated Apr. 7, 2015.
Notice of Acceptance for New Zealand Patent Application No. 622485 dated Nov. 24, 2014.
Notice of Allowance for U.S. Appl. No. 13/411,291 dated Apr. 22, 2016.
Notice of Allowance for U.S. Appl. No. 13/657,635 dated Jan. 29, 2016.
Notice of Allowance for U.S. Appl. No. 13/657,656 dated May 10, 2016.
Notice of Allowance for U.S. Appl. No. 13/767,779 dated Mar. 17, 2015.
Notice of Allowance for U.S. Appl. No. 13/827,627 dated Apr. 11, 2016.

(56) References Cited

OTHER PUBLICATIONS

Notice of Allowance for U.S. Appl. No. 14/019,534 dated Feb. 4, 2016.
Notice of Allowance for U.S. Appl. No. 14/254,757 dated Sep. 10, 2014.
Notice of Allowance for U.S. Appl. No. 14/254,773 dated Aug. 20, 2014.
Notice of Allowance for U.S. Appl. No. 14/304,741 dated Apr. 7, 2015.
Notice of Allowance for U.S. Appl. No. 14/581,902 dated Nov. 13, 2015.
Official Communication for Australian Patent Application No. 2013237658 dated Feb. 2, 2015.
Official Communication for Australian Patent Application No. 2013237710 dated Jan. 16, 2015.
Official Communication for Australian Patent Application No. 2014201580 dated Feb. 27, 2015.
Official Communication for Canadian Patent Application No. 2807899 dated Jul. 20, 2015.
Official Communication for Canadian Patent Application No. 2807899 dated Oct. 24, 2014.
Official Communication for Canadian Patent Application No. 2828264 dated Apr. 11, 2016.
Official Communication for Canadian Patent Application No. 2828264 dated Apr. 28, 2015.
Official Communication for Canadian Patent Application No. 2829266 dated Apr. 1, 2016.
Official Communication for Canadian Patent Application No. 2829266 dated Apr. 28, 2015.
Official Communication for European Patent Application No. 13157474.1 dated Apr. 29, 2016.
Official Communication for European Patent Application No. 13157474.1 dated Oct. 30, 2015.
Official Communication for European Patent Application No. 14159175.0 dated Feb. 4, 2016.
Official Communication for European Patent Application No. 14159464.8 dated Feb. 18, 2016.
Official Communication for European Patent Application No. 14159629.6 dated Jul. 31, 2014.
Official Communication for European Patent Application No. 14159629.6 dated Sep. 22, 2014.
Official Communication for European Patent Application No. 15159520.4 dated Jul. 15, 2015.
Official Communication for German Patent Application No. 10 2013 221 052.3 dated Mar. 24, 2015.
Official Communication for German Patent Application No. 10 2013 221 057.4 dated Mar. 23, 2015.
Official Communication for Great Britain Patent Application No. 1404574.4 dated Dec. 18, 2014.
Official Communication for Netherlands Patent Application No. 2011613 dated Aug. 13, 2015.
Official Communication for Netherlands Patent Application No. 2011627 dated Aug. 14, 2015.
Official Communication for Netherlands Patent Application No. 2012437 dated Sep. 18, 2015.
Official Communication for New Zealand Patent Application No. 616299 dated Jan. 26, 2015.
Official Communication for New Zealand Patent Application No. 622414 dated Mar. 24, 2014.
Official Communication for New Zealand Patent Application No. 622485 dated Nov. 21, 2014.
Official Communication for U.S. Appl. No. 13/411,291 dated Oct. 1, 2015.
Official Communication for U.S. Appl. No. 13/411,291 dated Jul. 15, 2015.
Official Communication for U.S. Appl. No. 13/608,864 dated Mar. 17, 2015.
Official Communication for U.S. Appl. No. 13/608,864 dated Jun. 8, 2015.
Official Communication for U.S. Appl. No. 13/657,635 dated Mar. 30, 2015.
Official Communication for U.S. Appl. No. 13/657,635 dated Oct. 7, 2015.
Official Communication for U.S. Appl. No. 13/657,656 dated May 6, 2015.
Official Communication for U.S. Appl. No. 13/657,656 dated Oct. 7, 2014.
Official Communication for U.S. Appl. No. 13/827,627 dated Mar. 2, 2015.
Official Communication for U.S. Appl. No. 13/827,627 dated Oct. 20, 2015.
Official Communication for U.S. Appl. No. 13/827,627 dated Dec. 22, 2015.
Official Communication for U.S. Appl. No. 13/827,627 dated Aug. 26, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 14/019,534 dated Jul. 20, 2015.
Official Communication for U.S. Appl. No. 14/019,534 dated Sep. 4, 2015.
Official Communication for U.S. Appl. No. 14/025,653 dated Mar. 3, 2016.
Official Communication for U.S. Appl. No. 14/025,653 dated Oct. 6, 2015.
Official Communication for U.S. Appl. No. 14/134,558 dated May 16, 2016.
Official Communication for U.S. Appl. No. 14/134,558 dated Oct. 7, 2015.
Official Communication for U.S. Appl. No. 14/304,741 dated Mar. 3, 2015.
Official Communication for U.S. Appl. No. 14/304,741 dated Aug. 6, 2014.
Official Communication for U.S. Appl. No. 14/877,229 dated Mar. 22, 2016.
Official Communication for European Patent Application No. 14159175.0 dated Jul. 17, 2014.
Official Communication for New Zealand Patent Application No. 622484 dated Apr. 2, 2014.
"A First Look: Predicting Market Demand for Food Retail using a Huff Analysis," TRF Policy Solutions, Jul. 2012, pp. 30.
"A Word About Banks and the Laundering of Drug Money," Aug. 18, 2012, http://www.golemxiv.co.uk/2012/08/a-word-about-banks-and-the-laundering-of-drug-money/.
Abbey, Kristen, "Review of Google Docs," May 1, 2007, pp. 2.
About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.
Acklen, Laura, "Absolute Beginner's Guide to Microsoft Word 2003," Dec. 24, 2003, pp. 15-18, 34-41, 308-316.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Anonymous, "A Real-World Problem of Matching Records," Nov. 2006, <http://grupoweb.upf.es/bd-web/slides/ullman.pdf> pp. 1-16.
Appacts, "Smart Thinking for Super Apps," <http://www.appacts.com> Printed Jul. 18, 2013 in 4 pages.
Apsalar, "Data Powered Mobile Advertising," "Free Mobile App Analytics" and various analytics related screen shots <http://apsalar.com> Printed Jul. 18, 2013 in 8 pages.
Ashraf, "Protect your Google Account (Gmail) by enabling SMS (text message) notifications for Suspicious Activity," online article

(56) References Cited

OTHER PUBLICATIONS from dotTech, Jan. 24, 2013, https://dottech.org/94405/how-to-setup-text-message-sms-google-notifications-for-suspicious-activity/.

Azad, Khalid, "A Visual Guide to Version Control," <http://betterexplained.com/articles/a-visual-guide-to-version-control/>, Sep. 27, 2007 in 11 pages.

Beverley, Bill, "Windows Tips & Tricks," <http://alamopc.org/pcalamode/columns/beverley/bb0301.shtml>, Mar. 2001 in 5 pages.

Bluttman et al., "Excel Formulas and Functions for Dummies," 2005, Wiley Publishing, Inc., pp. 280, 284-286.

Boyce, Jim, "Microsoft Outlook 2010 Inside Out," Aug. 1, 2010, retrieved from the internet https://capdtron.files.wordpress.com/2013/01/outlook-2010-inside_out.pdf.

Bradbard, Matthew, "Technical Analysis Applied," <http://partners.futuresource.com/fastbreak/2007/0905.htm>, Sep. 5, 2007, pp. 6.

Brandel, Mary, "Data Loss Prevention Dos and Don'ts," <http://web.archive.org/web/20080724024847/http://www.csoonline.com/article/221272/Dos_and_Don_ts_for_Data_Loss_Prevention>, Oct. 10, 2007, pp. 5.

Breierova et al., "An Introduction to Sensitivity Analysis," Publsihed by Massachusetts Institute of Technology, Cambridge, MA, Oct. 2001, pp. 67.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Chen et al., "A Novel Emergency Vehicle Dispatching System," 2013 IEEE 77th Vehicular Technology Conference, IEEE, Jun. 2, 2013, 5 pages.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Cohn, et al., "Semi-supervised clustering with user feedback," Constrained Clustering: Advances in Algorithms, Theory, and Applications 4.1 (2003): 17-32.

Conner, Nancy, "Google Apps: The Missing Manual," May 1, 2008, pp. 15.

Countly Mobile Analytics, <http://count.ly/> Printed Jul. 18, 2013 in 9 pages.

Definition "Identify", downloaded Jan. 22, 2015, 1 page.

Definition "Overlay", downloaded Jan. 22, 2015, 1 page.

Devanbu et al., "Authentic Third-party Data Publication", http://www.cs.ucdavis.edu/~devanbu/authdbpub.pdf, p. 19, 2000.

Distimo—App Analytics, <http://www.distimo.com/app-analytics> Printed Jul. 18, 2013 in 5 pages.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

Dreyer et al., "An Object-Oriented Data Model for a Time Series Management System," Proceedings of the 7th International Working Conference on Scientific and Statistical Database Management, Charlottesville, Virginia USA, Sep. 28-30, 1994, pp. 12.

Eklund et al., "A Dynamic Multi-source Dijkstra's Algorithm for Vehicle Routing," Intelligent Information Systems, 1996, pp. 329-333.

"E-MailRelay," <http://web.archive.org/web/20080821175021/http://emailrelay.sourceforge.net/> Aug. 21, 2008, pp. 2.

Fischer et al., "Populating a Release History Database From Version Control and Bug Tracking Systems," Software Maintenance, 2003, ICSM 2003, Proceedings International Conference, pp. 1-10.

Flurry Analytics, <http://www.flurry.com/> Printed Jul. 18, 2013 in 14 pages.

Galliford, Miles, "SnagIt Versus Free Screen Capture Software: Critical Tools for Website Owners," <http://www.subhub.com/articles/free-screen-capture-software>, Mar. 27, 2008, pp. 11.

Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.

GIS-NET 3 Public_Department of Regional Planning. Planning & Zoning Information for Unincorporated LA County. Retrieved Oct. 2, 2013 from http://gis.planning.lacounty.gov/GIS-NET3_Public/Viewer.html.

Google Analytics Official Website—Web Analytics & Reporting, <http://www.google.com/analytics.index.html> Printed Jul. 18, 2013 in 22 pages.

Gorr et al., "Crime Hot Spot Forecasting: Modeling and Comparative Evaluation", Grant 98-IJ-CX-K005, May 6, 2002, 37 pages.

Goswami, Gautam, "Quite Writly Said!," One Brick at a Time, Aug. 21, 2005, pp. 7.

"GrabUp—What a Timesaver!" <http://atlchris.com/191/grabup/>, Aug. 11, 2008, pp. 3.

Griffith, Daniel A., "A Generalized Huff Model," Geographical Analysis, Apr. 1982, vol. 14, No. 2, pp. 135-144.

Gu et al., "Record Linkage: Current Practice and Future Directions," Jan. 15, 2004, pp. 32.

Hansen et al., "Analyzing Social Media Networks with NodeXL: Insights from a Connected World", Chapter 4, pp. 53-67 and Chapter 10, pp. 143-164, published Sep. 2010.

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.

Hart et al., "A Formal Basis for the Heuristic Determination of Minimum Cost Paths," IEEE Transactions on Systems Science and Cybernetics, IEEE, vol. 1, No. 2, Jul. 1, 1968, pp. 100-107.

Hibbert et al., "Prediction of Shopping Behavior Using a Huff Model Within a GIS Framework," Healthy Eating in Context, Mar. 18, 2011, pp. 16.

Hogue et al., "Thresher: Automating the Unwrapping of Semantic Content from the World Wide Web," 14th International Conference on World Wide Web, WWW 2005: Chiba, Japan, May 10-14, 2005, pp. 86-95.

Hua et al., "A Multi-attribute Data Structure with Parallel Bloom Filters for Network Services", HiPC 2006, LNCS 4297, pp. 277-288, 2006.

Huang et al., "Systematic and Integrative Analysis of Large Gene Lists Using DAVID Bioinformatics Resources," Nature Protocols, 4.1, 2008, 44-57.

Huff et al., "Calibrating the Huff Model Using ArcGIS Business Analyst," ESRI, Sep. 2008, pp. 33.

Huff, David L., "Parameter Estimation in the Huff Model," ESRI, ArcUser, Oct.-Dec. 2003, pp. 34-36.

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

JetScreenshot.com, "Share Screenshots via Internet in Seconds," <http://web.archive.org/web/20130807164204/http://www.jetscreenshot.com/>, Aug. 7, 2013, pp. 1.

Johnson, Maggie, "Introduction to YACC and Bison," CS143, Handout 13, Jul. 8, 2005, pp. 11.

Johnson, Steve, "Access 2013 on demand," Access 2013 on Demand, May 9, 2013, Que Publishing.

Jotshi et al., "Dispatching and Routing of Emergency Vehicles in Disaster Mitigation Using Data Fusion." Socio-Economic Planning Sciences, Pergamon, Amsterdam, Netherlands, vol. 43, No. 1, Mar. 1, 2009, 24 pages.

(56) References Cited

OTHER PUBLICATIONS

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Kwout, <http://web.archive.org/web/20080905132448/http://www.kwout.com/> Sep. 5, 2008, pp. 2.
Li et al., "Interactive Multimodal Visual Search on Mobile Device," IEEE Transactions on Multimedia, vol. 15, No. 3, Apr. 1, 2013, pp. 594-607.
Lim et al., "Resolving Attribute Incompatibility in Database Integration: An Evidential Reasoning Approach," Department of Computer Science, University of Minnesota, 1994, <http://reference.kfupm.edu.sa/content/r/e/resolving_attribute_incompatibility_in_d_531691.pdf> pp. 1-10.
Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Microsoft Windows, "Microsoft Windows Version 2002 Print Out 2," 2002, pp. 1-6.
Microsoft, "Introduction to Versioning," <http://office.microsoft.com/en-us/sharepointtechnolgy/HA010021576.aspx?mode=print>, 2007 in 3 pages.
Microsoft, "How Word Creates and Recovers the AutoRecover files," <http://support.microsoft.com/kb/107686>, Article ID: 107686, printed Feb. 11, 2010 in 3 pages.
Microsoft, "Managing Versions and Checking Documents In and Out (Windows SharePoint Services 2.0)," <http://technet.microsoft.com/en-us/library/cc287876.aspx>, Aug. 22, 2005 in 2 pages.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Mitzenmacher, Michael, "Compressed Bloom Filters," IEEE/ACM Tranactions on Networking, vol. 10, No. 5, Oct. 2002, pp. 604-612.
Mixpanel—Mobile Analytics, <https://mixpanel.com/> Printed Jul. 18, 2013 in 13 pages.
Mohring et al., "Partitioning Graphs to Speedup Dijkstra's Algorithm," ACM Journal of Experimental Algorithmics, Association of Computing Machinery, New York, New York, vol. 11, Jan. 1, 2006, 29 pages.
"Money Laundering Risks and E-Gaming: A European Overview and Assessment," 2009, http://www.cf.ac.uk/socsi/resources/Levi_Final_Money_Laundering_Risks_egaming.pdf.
Nadeau et al., "A Survey of Named Entity Recognition and Classification," Jan. 15, 2004, pp. 20.
Nierman, "Evaluating Structural Similarity in XML Documents", 6 pages, 2002.
Nin et al., "On the Use of Semantic Blocking Techniques for Data Cleansing and Integration," 11th International Database Engineering and Applications Symposium, 2007, pp. 9.
Nitro, "Trick: How to Capture a Screenshot as PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Nolan et al., "MCARTA: A Malicious Code Automated Run-Time Analysis Framework," Homeland Security, 2012 IEEE Conference on Technologies for, Nov. 13, 2012, pp. 13-17.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Online Tech Tips, "Clip2Net—Share files, folders and screenshots easily," <http://www.online-tech-tips.com/free-software-downloads/share-files-folders-screenshots/>, Apr. 2, 2008, pp. 5.
Open Web Analytics (OWA), <http://www.openwebanalytics.com/> Printed Jul. 19, 2013 in 5 pages.
O'Reilly.com, http://oreilly.com/digitalmedia/2006/01/01/mac-os-x-screenshot-secrets.html published Jan. 1, 2006 in 10 pages.
Palantir Technolgies, "Palantir Labs—Timeline," Oct. 1, 2010, retrieved from the internet https://www.youtube.com/watch?v=JCgDW5bru9M retrieved on Aug. 19, 2015.
Palmas et al., "An Edge-Bunding Layout for Interactive Parallel Coordinates" 2014 IEEE Pacific Visualization Symposium, pp. 57-64.
Perdisci et al., "Behavioral Clustering of HTTP-Based Malware and Signature Generation Using Malicious Network Traces," USENIX, Mar. 18, 2010, pp. 1-14.
Piwik—Free Web Analytics Software. <http://piwik.org/> Printed Jul. 19, 2013 in18 pages.
Plášil et al., "An Architectural View of Distributed Objects and Components in CORBA, Java RMI and COM/DCOM," Software—Concepts & Tools, vol. 19, No. 1, Jun. 1, 1998, pp. 14-28.
"Potential Money Laundering Warning Signs," snapshot taken 2003, https://web.archive.org/web/20030816090055/http://finsolinc.com/ANTIMONEY%20LAUNDERING%20TRAINING%20GUIDES.pdf.
Pythagoras Communications Ltd., "Microsoft CRM Duplicate Detection," Sep. 13, 2011, https://www.youtube.com/watch?v=j-7Qis0D0Kc.
Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.
Quest, "Toad for ORACLE 11.6—Guide to Using Toad," Sep. 24, 2012, pp. 1-162.

(56) References Cited

OTHER PUBLICATIONS

Reedy, Sarah, "Policy and Charging Rules Function (PCRF)," Sep. 13, 2010, http://www.lightreading.com/document.asp?doc_id=680015 printed Dec. 10, 2013 in 4 pages.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Rouse, Margaret, "OLAP Cube," <http://searchdatamanagement.techtarget.com/definition/OLAP-cube>, Apr. 28, 2012, pp. 16.
Schroder, Stan, "15 Ways to Create Website Screenshots," <http://mashable.com/2007/08/24/web-screenshots/>, Aug. 24, 2007, pp. 2.
Schwieger, V., "Sensitivity Analysis as a General Tool for Model Optimisation-Examples for Trajectory Estimation," 3rd IAG/12th FIG Symposium, Baden, Germany, May 22-24, 2006, Published by IAG, 2006, pp. 10.
Schwieger, V., "Variance-Based Sensitivity Analysis for Model Evaluation in Engineering Surveys," INGEO 2004 and FIG Regional Central and Eastern European Conference on Engineering Surveying, Nov. 11-13, 2004, Published by INGEO, Bratislava, Slovakia, 2004, pp. 10.
Sekine et al., "Definition, Dictionaries and Tagger for Extended Named Entity Hierarchy," May 2004, pp. 1977-1980.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
SnagIt, "SnagIt 8.1.0 Print Out 2," Software release date Jun. 15, 2006, pp. 1-3.
SnagIt, "SnagIt 8.1.0 Print Out," Software release date Jun. 15, 2006, pp. 6.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
StatCounter—Free Invisible Web Tracker, Hit Counter and Web Stats, <http://statcounter.com/> Printed Jul. 19, 2013 in 17 pages.
Symantec Corporation, "E-Security Begins with Sound Security Policies," Announcement Symantec, Jun. 14, 2001.
TestFlight—Beta Testing on the Fly, <http://testflightapp.com/> Printed Jul. 18, 2013 in 3 pages.
Thompson, Mick, "Getting Started with GEO," Getting Started with GEO, Jul. 26, 2011.
Traichal et al., "Forecastable Default Risk Premia and Innovations," Journal of Economics and Finance, Fall 1999, vol. 23, No. 3, pp. 214-225.
trak.io, <http://trak.io/> printed Jul. 18, 2013 in 3 pages.
Umagandhi et al., "Search Query Recommendations Using Hybrid User Profile with Query Logs," International Journal of Computer Applications, vol. 80, No. 10, Oct. 1, 2013, pp. 7-18.
CMSC 341, "Introduction to Trees," <http://www.csee.umbc.edu/courses/undergraduate/341/fall07/Lectures/Trees/TreeIntro.pdf>, Power Point Presentation, Baltimore, Maryland, Aug. 3, 2007, pp. 29.
UserMetrix, <http://usermetrix.com/android-analytics> printed Jul. 18, 2013 in 3 pages.
"Using Whois Based Geolocation and Google Maps API for Support Cybercrime Investigations," http://wseas.us/e-library/conferences/2013/Dubrovnik/TELECIRC/TELECIRC-32.pdf.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wagner et al., "Dynamic Shortest Paths Containers," Electronic Notes in Theoretical Computer Science, vol. 92, No. 1, 2003, pp. 1-19.
Wahl, "How to Create a small Multiple Masterpiece in Tableau," Nov. 10, 2014, in 16 pages.
Wang et al., "Research on a Clustering Data De-Duplication Mechanism Based on Bloom Filter," IEEE 2010, 5 pages.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Wikipedia, "Federated Database System," Sep. 7, 2013, retrieved from the internet on Jan. 27, 2015 http://en.wikipedia.org/w/index.php?title=Federated_database_system&oldid=571954221.
Wikipedia, "Multimap," Jan. 1, 2013, https://en.wikipedia.org/w/index.php?title=Multimap&oldid=530800748.
Wright et al., "Palantir Technologies VAST 2010 Challenge Text Records—Investigations into Arms Dealing," Oct. 29, 2010, pp. 1-10, retrieved from the internet http://hcil2.cs.umd.edu/newvarepository/VAST%20Challenge%202010/challenges/MC1%20-%20Investigations%20into%20Arms%20Dealing/entries/Palantir%20Technologies/ retrieved on Aug. 20, 2015.
Xobni, "About Page, " http://www.xobni.com/about/ printed Jun. 26, 2014 in 2 pages.
Xobni, "Blog," http://blog.xobni.com/ printed Jun. 26, 2014 in 11 pages.
Xobni, http://www.xobni.com/ printed Jun. 26, 2014 in 5 pages.
Yahoo, <http://web.archive.org/web/20020124161606/http://finance.yahoo.com/q?s=%5eIXIC&d=c . . . > printed Mar. 6, 2012 in 2 pages.
Yang et al., "An Enhanced Routing Method with Dijkstra Algorithm and AHP Analysis in GIS-based Emergency Plan," Geoinformatics, 2010 18th International Conference on, IEEE, Piscataway, New Jersey, Jun. 18, 2010, 6 pages.
Yang et al., "HTML Page Analysis Based on Visual Cues", A129, pp. 859-864, 2001.
Zhao et al., "Entity Matching Across Heterogeneous Data Sources: An Approach Based on Constrained Cascade Generalization," Data & Knowledge Engineering, vol. 66, No. 3, Sep. 2008, pp. 368-381.
International Search Report and Written Opinion for Patent Application No. PCT/US2008/056439 dated Jun. 8, 2009.
International Search Report and Written Opinion for Patent Application No. PCT/US2008/077244 dated Nov. 28, 2008.
International Search Report and Written Opinion for Patent Application No. PCT/US2009/056700 dated Apr. 15, 2010.
International Search Report and Written Opinion for Patent Application No. PCT/US2009/056703 dated Mar. 15, 2010.
International Search Report and Written Opinion for Patent Application No. PCT/US2009/056705 dated Mar. 26, 2010.
International Search Report and Written Opinion for Patent Application No. PCT/US2009/056707 dated Mar. 2, 2010.
International Search Report and Written Opinion for Patent Application No. PCT/US2009/056738 dated Mar. 29, 2010.
International Search Report and Written Opinion for Patent Application No. PCT/US2009/056742 dated Apr. 19, 2010.
Notice of Acceptance for Australian Patent Application No. 2014250678 dated Oct. 7, 2015.
Notice of Allowance for U.S. Appl. No. 12/556,318 dated Nov. 2, 2015.
Notice of Allowance for U.S. Appl. No. 13/196,788 dated Dec. 18, 2015.
Notice of Allowance for U.S. Appl. No. 13/826,228 dated Mar. 27, 2015.
Notice of Allowance for U.S. Appl. No. 13/922,212 dated Mar. 9, 2016.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/148,568 dated Aug. 26, 2015.
Notice of Allowance for U.S. Appl. No. 14/149,608 dated Aug. 5, 2014.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/265,637 dated Feb. 13, 2015.

(56) References Cited

OTHER PUBLICATIONS

Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/302,279 dated Apr. 5, 2016.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/326,738 dated Nov. 18, 2015.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/479,863 dated Mar. 31, 2015.
Notice of Allowance for U.S. Appl. No. 14/486,991 dated May 1, 2015.
Notice of Allowance for U.S. Appl. No. 14/504,103 dated May 18, 2015.
Notice of Allowance for U.S. Appl. No. 14/552,336 dated Nov. 3, 2015.
Notice of Allowance for U.S. Appl. No. 14/616,080 dated Apr. 2, 2015.
Notice of Allowance for U.S. Appl. No. 14/746,671 dated Jan. 21, 2016.
Notice of Allowance for U.S. Appl. No. 14/923,364 dated May 6, 2016.
Notice of Allowance for U.S. Appl. No. 15/066,970 dated Jun. 29, 2016.
Official Communication for Australian Patent Application No. 2014201506 dated Feb. 27, 2015.
Official Communication for Australian Patent Application No. 2014201507 dated Feb. 27, 2015.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014203669 dated May 29, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for Canadian Patent Application No. 2846414 dated Apr. 13, 2016.
Official Communication for European Patent Application No. 08730336.8 dated Jun. 6, 2012.
Official Communication for European Patent Application No. 08839003.4 dated Aug. 14, 2012.
Official Communication for European Patent Application No. 09813700.3 dated Apr. 3, 2014.
Official Communication for European Patent Application No. 09813693.0 dated Apr. 8, 2014.
Official Communication for European Patent Application No. 13157474.1 dated May 28, 2013.
Official Communication for European Patent Application No. 14158861.6 dated Jun. 16, 2014.
Official Communication for European Patent Application No. 14158958.0 dated Jun. 3, 2014.
Official Communication for European Patent Application No. 14158977.0 dated Jun. 10, 2014.
Official Communication for European Patent Application No. 14158977.0 dated Apr. 16, 2015.
Official Communication for European Patent Application No. 14159418.4 dated Oct. 8, 2014.
Official Communication for European Patent Application No. 14159464.8 dated Jul. 31, 2014.
Official Communication for European Patent Application No. 14162372.8 dated Apr. 30, 2015.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14199182.8 dated Mar. 13, 2015.
Official Communication for European Patent Application No. 14200246.8 dated May 29, 2015.
Official Communication for European Patent Application No. 14200298.9 dated May 13, 2015.
Official Communication for European Patent Application No. 15155845.9 dated Oct. 6, 2015.
Official Communication for European Patent Application No. 15155846.7 dated Jul. 8, 2015.
Official Communication for European Patent Application No. 15165244.3 dated Aug. 27, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15181419.1 dated Sep. 29, 2015.
Official Communication for European Patent Application No. 15183721.8 dated Nov. 23, 2015.
Official Communication for European Patent Application No. 15184764.7 dated Dec. 14, 2015.
Official Communication for Great Britain Patent Application No. 1318666.3 dated Mar. 25, 2014.
Official Communication for Great Britain Patent Application No. 1318667.1 dated Mar. 28, 2014.
Official Communication for Great Britain Patent Application No. 1404457.2 dated Aug. 14, 2014.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.

(56) References Cited

OTHER PUBLICATIONS

Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012436 dated Nov. 6, 2015.
Official Communication for Netherlands Patent Application No. 2012438 dated Sep. 21, 2015.
Official Communication for Netherlands Patent Application No. 2013134 dated Apr. 20, 2015.
Official Communication for Netherlands Patent Application No. 2013306 dated Apr. 24, 2015.
Official Communication for New Zealand Patent Application No. 616212 dated May 7, 2014.
Official Communication for New Zealand Patent Application No. 616212 dated Oct. 9, 2013.
Official Communication for New Zealand Patent Application No. 622389 dated Mar. 20, 2014.
Official Communication for New Zealand Patent Application No. 622404 dated Mar. 20, 2014.
Official Communication for New Zealand Patent Application No. 622439 dated Mar. 24, 2014.
Official Communication for New Zealand Patent Application No. 622439 dated Jun. 6, 2014.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 623323 dated Apr. 17, 2014.
Official Communication for New Zealand Patent Application No. 623323 dated Jun. 6, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/210,947 dated Jul. 1, 2013.
Official Communication for U.S. Appl. No. 12/210,947 dated Aug. 19, 2014.
Official Communication for U.S. Appl. No. 12/210,947 dated Nov. 28, 2014.
Official Communication for U.S. Appl. No. 12/210,947 dated Apr. 8, 2011.
Official Communication for U.S. Appl. No. 12/210,980 dated Mar. 10, 2015.
Official Communication for U.S. Appl. No. 12/556,318 dated Jul. 2, 2015.
Official Communication for U.S. Appl. No. 12/556,321 dated Feb. 25, 2016.
Official Communication for U.S. Appl. No. 12/556,321 dated Oct. 6, 2016.
Official Communication for U.S. Appl. No. 12/556,321 dated Jul. 7, 2015.
Official Communication for U.S. Appl. No. 13/079,690 dated Sep. 11, 2013.
Official Communication for U.S. Appl. No. 13/079,690 dated Jan. 29, 2014.
Official Communication for U.S. Appl. No. 13/079,690 dated Mar. 5, 2015.
Official Communication for U.S. Appl. No. 13/196,788 dated Oct. 23, 2015.
Official Communication for U.S. Appl. No. 13/196,788 dated Nov. 25, 2015.
Official Communication for U.S. Appl. No. 13/218,238 dated Nov. 21, 2013.
Official Communication for U.S. Appl. No. 13/218,238 dated Oct. 25, 2013.
Official Communication for U.S. Appl. No. 13/218,238 dated Jul. 29, 2013.
Official Communication for U.S. Appl. No. 13/218,238 dated Jan. 6, 2014.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/657,635 dated Jul. 10, 2014.
Official Communication for U.S. Appl. No. 13/669,274 dated May 6, 2015.
Official Communication for U.S. Appl. No. 13/728,879 dated Mar. 17, 2015.
Official Communication for U.S. Appl. No. 13/799,535 dated Jul. 29, 2014.
Official Communication for U.S. Appl. No. 13/799,535 dated Feb. 3, 2014.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Mar. 30, 2016.
Official Communication for U.S. Appl. No. 13/827,491 dated Oct. 9, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 13/922,212 dated Jan. 5, 2015.
Official Communication for U.S. Appl. No. 13/937,063 dated Apr. 22, 2016.
Official Communication for U.S. Appl. No. 14/141,252 dated Oct. 8, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Dec. 21, 2015.

(56) References Cited

OTHER PUBLICATIONS

Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/265,637 dated Nov. 18, 2014.
Official Communication for U.S. Appl. No. 14/265,637 dated Sep. 26, 2014.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/302,279 dated Sep. 24, 2015.
Official Communication for U.S. Appl. No. 14/306,138 dated Sep. 14, 2015.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated Dec. 24, 2015.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Dec. 24, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,161 dated Jan. 23, 2015.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/473,552 dated Feb. 24, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/486,991 dated Mar. 10, 2015.
Official Communication for U.S. Appl. No. 14/490,612 dated Aug. 18, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/516,386 dated Feb. 24, 2016.
Official Communication for U.S. Appl. No. 14/516,386 dated Apr. 27, 2017.
Official Communication for U.S. Appl. No. 14/516,386 dated Jun. 30, 2016.
Official Communication for U.S. Appl. No. 14/516,386 dated Nov. 4, 2016.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.

(56) References Cited

OTHER PUBLICATIONS

Official Communication for U.S. Appl. No. 14/562,524 dated Feb. 18, 2016.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/618,213 dated May 16, 2017.
Official Communication for U.S. Appl. No. 14/631,633 dated Sep. 10, 2015.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/715,834 dated Apr. 13, 2016.
Official Communication for U.S. Appl. No. 14/715,834 dated Jun. 28, 2016.
Official Communication for U.S. Appl. No. 14/715,834 dated Feb. 29, 2016.
Official Communication for U.S. Appl. No. 14/726,211 dated Apr. 5, 2016.
Official Communication for U.S. Appl. No. 14/726,353 dated Sep. 10, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/816,599 dated Dec. 22, 2016.
Official Communication for U.S. Appl. No. 14/816,599 dated May 31, 2017.
Official Communication for U.S. Appl. No. 14/842,734 dated Nov. 19, 2015.
Official Communication for U.S. Appl. No. 14/923,374 dated May 23, 2016.
Official Communication for U.S. Appl. No. 14/923,374 dated Feb. 9, 2016.
Official Communication for U.S. Appl. No. 15/017,324 dated Apr. 22, 2016.
Restriction Requirement for U.S. Appl. No. 13/839,026 dated Apr. 2, 2015.
International Search Report and Written Opinion for Patent Application No. PCT/US2009/056700 dated Apr. 19, 2010.
Notice of Allowance for U.S. Appl. No. 14/516,386 dated Sep. 1, 2017.
Notice of Allowance for U.S. Appl. No. 14/715,834 dated Sep. 27, 2017.
Notice of Allowance for U.S. Appl. No. 15/144,602 dated Sep. 7, 2017.
Official Communication for European Patent Application No. 12181585.6 dated Sep. 4, 2015.
Official Communication for European Patent Application No. 12181585.6 dated Jan. 7, 2013.
Official Communication for European Patent Application No. 14158861.6 dated Nov. 2, 2016.
Official Communication for European Patent Application No. 14158958.0 dated Apr. 16, 2015.
Official Communication for European Patent Application No. 15159520.4 dated Jul. 20, 2016.
Official Communication for New Zealand Patent Application No. 616299 dated Oct. 9, 2013.
Official Communication for U.S. Appl. No. 12/556,321 dated Jun. 30, 2017.
Official Communication for U.S. Appl. No. 14/562,420 dated Jul. 3, 2017.
Official Communication for U.S. Appl. No. 14/618,213 dated Oct. 24, 2017.
Official Communication for U.S. Appl. No. 14/715,834 dated Aug. 28, 2017.

* cited by examiner

US 10,180,977 B2

DETERMINING AND EXTRACTING CHANGED DATA FROM A DATA SOURCE

INCORPORATION BY REFERENCE TO ANY PRIORITY APPLICATIONS

This application is a continuation of U.S. application Ser. No. 15/066,970, filed Mar. 10, 2016, which is a continuation of U.S. application Ser. No. 14/581,902, filed Dec. 23, 2014, now U.S. Pat. No. 9,292,388, which is a continuation of U.S. application Ser. No. 14/254,773, filed Apr. 16, 2014, now U.S. Pat. No. 8,924,429, which claims the benefit of U.S. Provisional Application No. 61/955,054, filed Mar. 18, 2014, the entire contents of each of which is incorporated herein by reference. Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for data integration and analysis. More specifically, the present disclosure relates to identifying changes in the data of a data source.

BACKGROUND

Organizations and/or companies are producing increasingly large amounts of data. Such data may be stored in different data sources. Data sources may be updated, e.g., periodically.

SUMMARY

The systems, methods, and devices described herein each have several aspects, no single one of which is solely responsible for its desirable attributes. Without limiting the scope of this disclosure, several non-limiting features will now be discussed briefly.

In one embodiment, a computer system configured to obtain changed data from a data source comprises: one or more hardware computer processors configured to execute code in order to cause the system to: obtain information indicating a plurality of groupings of data stored in one or more files or databases in a data source, the information indicating a number of data items included in each of the plurality of groupings; determine a first grouping of the plurality of groupings including one or more data items that have changed by comparing a first number of data items included in the first grouping and a historical first number of data items included in a corresponding local version of the first grouping, wherein the corresponding local version of the first grouping is created based on data items included in the first grouping at a first time prior to said obtaining the information indicating the plurality of groupings of the data; access data items included in the first grouping from the data source; compare the data items included in the first grouping to data items of the corresponding local version of the first grouping to determine which data items of the first grouping from the data source have changed; extract the changed data items of the first grouping; and forward the extracted changed data items to a destination system.

In another embodiment, a method of obtaining changed data from a data source comprises: obtaining, by one or more hardware computer processors, information indicating a plurality of groupings of data stored in one or more files or databases in a data source, the information indicating a number of data items included in each of the plurality of groupings; determining, by the one or more hardware computer processors, a first grouping of the plurality of groupings including one or more data items that have changed by comparing a first number of data items included in the first grouping and a historical first number of data items included in a corresponding local version of the first grouping, wherein the corresponding local version of the first grouping is created based on data items included in the first grouping at a first time prior to said obtaining the information indicating the plurality of groupings of the data; accessing, by the one or more hardware computer processors, data items included in the first grouping from the data source; comparing, by the one or more hardware computer processors, the data items included in the first grouping to data items of the corresponding local version of the first grouping to determine which data items of the first grouping from the data source have changed; extracting, by the one or more hardware computer processors, the changed data items of the first grouping; and forwarding, by the one or more hardware computer processors, the extracted changed data items to a destination system.

In yet another embodiment, a non-transitory computer readable medium comprises instructions for obtaining changed data from a data source that cause a computer processor to: obtain information indicating a plurality of groupings of data stored in one or more files or databases in a data source, the information indicating a number of data items included in each of the plurality of groupings; determine a first grouping of the plurality of groupings including one or more data items that have changed by comparing a first number of data items included in the first grouping and a historical first number of data items included in a corresponding local version of the first grouping, wherein the corresponding local version of the first grouping is created based on data items included in the first grouping at a first time prior to said obtaining the information indicating the plurality of groupings of the data; access data items included in the first grouping from the data source; compare the data items included in the first grouping to data items of the corresponding local version of the first grouping to determine which data items of the first grouping from the data source have changed; extract the changed data items of the first grouping; and forward the extracted changed data items to a destination system.

In some embodiments, a computer system configured to obtain changed data from a data source comprises: one or more hardware computer processors configured to execute code in order to cause the system to: obtain information indicating a plurality of groupings of data of a data source, the information indicating a number of data items included in each of the plurality of groupings; determine a first grouping of the plurality of groupings including one or more data items that have changed by comparing a first number of data items included in the first grouping and a historical number of data items included in each of the plurality of groupings; access data items included in the first grouping from the data source; compare the data items included in the first grouping to data items of a corresponding local version of the first grouping to determine which data items of the first grouping from the data source have changed, wherein the corresponding local version of the first grouping of data items is a compressed version of the first grouping of data items; extract the changed data items of the first grouping; and forward the extracted changed data items to a destination system.

In certain embodiments, a method of obtaining changed data from a data source comprises: obtaining, by one or more hardware computer processors, information indicating a plurality of groupings of data of a data source, the information indicating a number of data items included in each of the plurality of groupings; determining, by the one or more hardware computer processors, a first grouping of the plurality of groupings including one or more data items that have changed by comparing a first number of data items included in the first grouping and a historical number of data items included in each of the plurality of groupings; accessing, by the one or more hardware computer processors, data items included in the first grouping from the data source; comparing, by the one or more hardware computer processors, the data items included in the first grouping to data items of a corresponding local version of the first grouping to determine which data items of the first grouping from the data source have changed, wherein the corresponding local version of the first grouping of data items is a compressed version of the first grouping of data items; extracting, by the one or more hardware computer processors, the changed data items of the first grouping; and forwarding, by the one or more hardware computer processors, the extracted changed data items to a destination system.

In other embodiments, a non-transitory computer readable medium comprises instructions for obtaining changed data from a data source that cause a computer processor to: obtain information indicating a plurality of groupings of data of a data source, the information indicating a number of data items included in each of the plurality of groupings; determine a first grouping of the plurality of groupings including one or more data items that have changed by comparing a first number of data items included in the first grouping and a historical number of data items included in each of the plurality of groupings; access data items included in the first grouping from the data source; compare the data items included in the first grouping to data items of a corresponding local version of the first grouping to determine which data items of the first grouping from the data source have changed, wherein the corresponding local version of the first grouping of data items is a compressed version of the first grouping of data items; extract the changed data items of the first grouping; and forward the extracted changed data items to a destination system.

DETAILED DESCRIPTION

Overview

Figure 1:
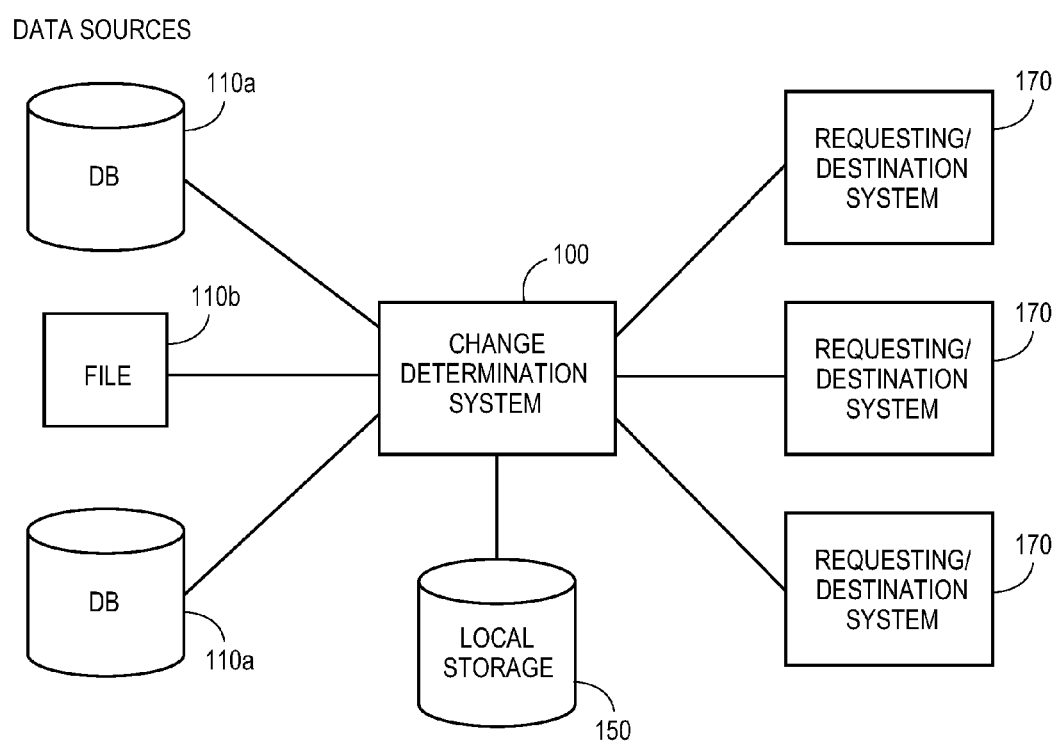
FIG. 1 is a block diagram illustrating one embodiment of a change determination system configured to determine and obtain changes in data of a plurality of data sources.

Organizations may need to obtain data from one or more data sources. Often, data for a particular timeframe is downloaded from a data source. For example, a data source may contain log files, and log files for the past two days may be downloaded. However, some of the data may already have been obtained at a previous time, and the system that is requesting the data may not be able to distinguish between data that it already has and new or changed data that it has not yet been obtained. For instance, the requesting system may simply store the data it downloads each time without considering whether some data is duplicated. Some data may be downloaded again even though it already exists in the system. Accordingly, there is a need for identifying and extracting changed data from a data source in an efficient manner.

As disclosed herein, a change determination system may be configured to identify and obtain changes in data from one or more data sources. For example, the system can determine that there are changes to the data of a data source (e.g., the data for a particular timeframe, such as a day) based on some summary information for a current set of data from the data source (e.g., lines of data associated with a particular day in a previously received data set) compared to a current set of data from the data source (e.g., lines of data associated with the particular day in a current data set). Once pieces of data with changes are identified (e.g., days with different amounts of lines of data), the changed data may be obtained and compared to a local version of the data (or some representation of the data) in order to identify the particular data items (e.g., particular lines of data) that have changed, such that only those particular data items need be provided by the data source.

A data source can be one or more databases and/or one or more files. The actual changes can be forwarded to a destination system for storage. The change determination system can act as an intermediary between data sources and one or more destination systems to identify changed data and forward only the changed data to the destination systems.

It may take a lot of time to download from a data source (e.g., due to slow speed, amount of data, etc.), and re-downloading data that already exists in the destination system can lead to spending unnecessary time and resources. Moreover, saving duplicate data can take up unnecessary storage space in the destination system. By identifying and forwarding only the changed data, the change determination system can provide a way to obtain data from a data source in an intelligent manner and can save time and/or resources for the destination system. This can be very helpful especially when a data source contains large amounts of data, and only a small portion of the data has changed. The change determination system can also identify the changes quickly, for example, by performing a grouping operation on the data explained in detail below.

Change Determination System

FIG. 1 is a block diagram illustrating one embodiment of a change determination system 100 configured to determine and obtain changes in data of a plurality of data sources 110. A data source 110 can include one or more databases 110a, one or more files 110b (e.g., flat file or file system), any other type of data structure, or a combination of multiple data structures. Data in the database 110a may be organized into one or more tables, which include rows and columns. Data in the file 110b may be organized as lines with various fields. For example, a file 110b may be in CSV format. Data in files, databases, or other data structure, may be referred to in terms of "lines," where a line is a subset of the file. For example, lines of a file may be groups of data between newline markers or divisions of text of the file into predetermined size groups (e.g., each line includes 255 characters) and lines of a database may be a row or some other subset of information in the database. Data in a database 110a and a file 110b may be handled or processed in a similar manner by the change determination system ("CDS") 100. In certain embodiments, the CDS 100 obtains changes from a single data source 110, instead of multiple data sources 110.

The CDS 100 may include one or more components (not shown) that perform functions relating to determining and obtaining changes in the data of data sources 110. The CDS 100 may also include local storage 150, which can store any local version of the data in a data source 110, such as a summarized and/or compressed version of the data. The local version of the data can be used to identify the actual changes in the data of the data source 210 and/or portions of the data (e.g., lines of the data) that include changes. The local version may include some or all of the data of a data source, depending on the embodiment.

One or more destination systems 270 may request changed data from the CDS 100. The destination systems 270 may send a request on a periodic basis (e.g., scheduled), on demand, etc. The CDS 100 may also periodically check a data source(s) 210 and forward any changes without receiving a request from a destination system 270. For example, the CDS 100 may be scheduled to check the data sources 210 every 2 hours. Such a schedule may be defined as one or more policies. In one embodiment, a destination system 270 includes the CDS 100, such that the functionality described herein with reference to the CDS 100 may be performed by the destination system 270 itself.

Figure 2A:
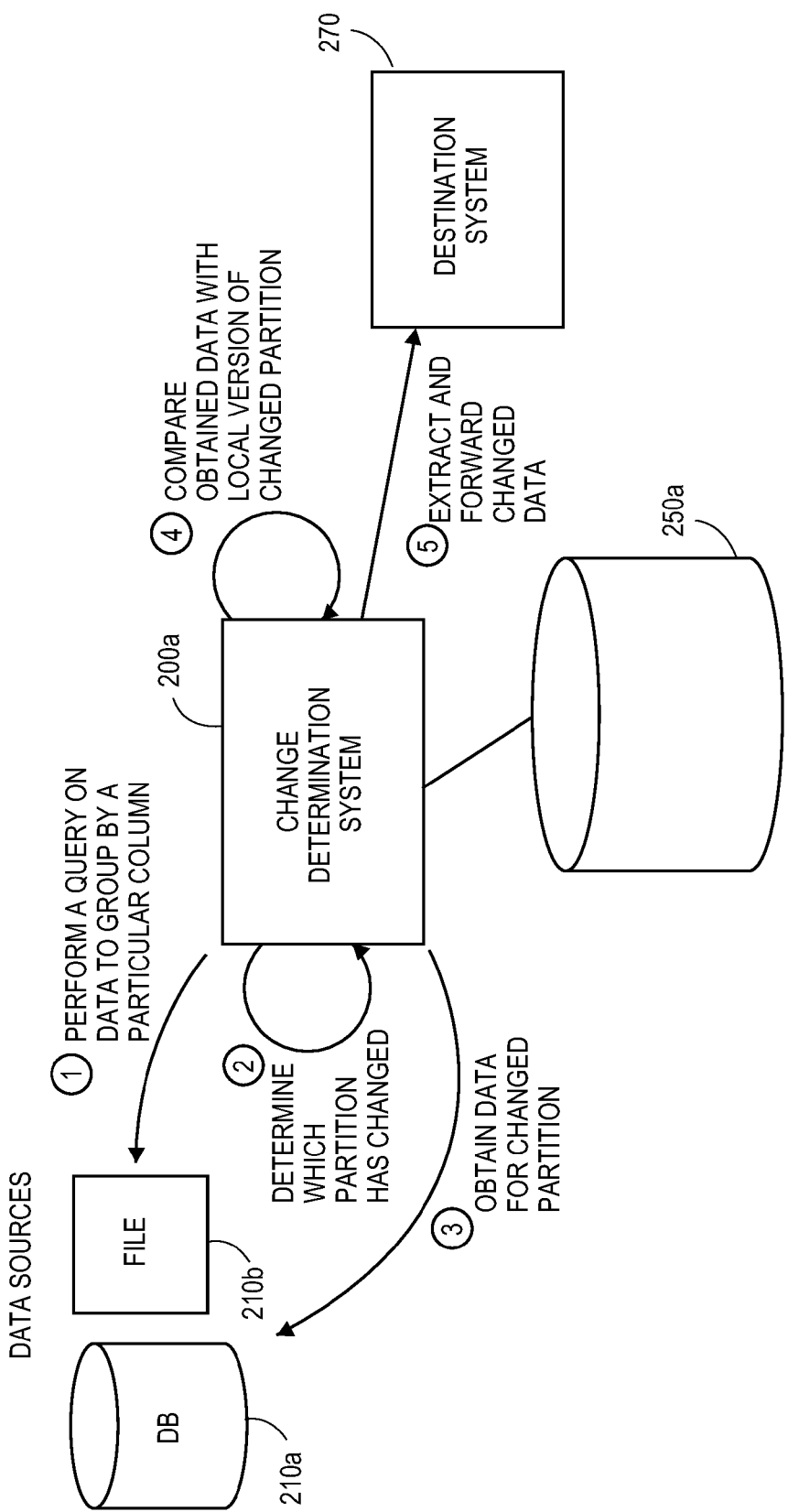
FIG. 2A is a data flow diagram illustrative of the interaction between the various components of a change determination system configured to determine and obtain changes in data of a plurality of data sources, according to one embodiment.

FIG. 2A is a data flow diagram illustrative of the interaction between the various components of a change determination system 200a configured to determine and obtain changes in data of a plurality of data sources, according to one embodiment. The CDS 200a and corresponding components of FIG. 2A may be similar to or the same as the CDS 100 and similarly named components of FIG. 1.

At data flow action 1, the CDS 200a performs a query on the data in a data source 210 to group by a particular attribute, such as a column of information in a table. For purposes of discussion herein, many examples are discussed with reference to grouping based on one or more "columns," where each column is associated with a particular attribute. In other embodiments, attributes may be associated with different display features of a data structure (e.g., besides columns). For example, if the data source 210 is a database 210a, the CDS 200a can perform an SQL query and group by a particular column in a table, e.g., by using the GROUP BY clause, which is used in SQL to group rows having common values into a smaller set of rows. The smaller sets of rows may be referred to as partitions or groups. Each partition includes rows that have the same value for the designated column. GROUP BY is often used in conjunction with SQL aggregation functions or to eliminate duplicate rows from a result set.

The column that is designated as the column for GROUP BY should be able to provide some indication of which rows are new or changed from the previous time the CDS 200a obtained data from the data source 210. In one example, a table in the database 210a includes a last updated column, which includes a timestamp for when the data in the row was last updated, and the data in the database 210a can be grouped by the last updated column. Since the timestamp can include the hour, minute, second, etc. in addition to the date, only the date of the timestamp might be used for GROUP BY. In such case, a partition would be based on a day, and each partition would contain the rows for each day. An aggregate function such as COUNT can be applied to the results of GROUP BY in order to obtain the number of rows for each partition. The results of the query from the data source 210 can include one or more partitions from the GROUP BY and the number of rows included in each partition. The CDS 200a may store the results or keep track of the results locally so that the results can be compared the next time the CDS 200a requests this type of information from the data source 210.

Data from a file data source 210b may also be queried in a similar manner. The CDS 200a may use different adapters to access data residing in one or more databases 210a and data residing in one or more files 210b, but once the data is obtained, it can be handled in the same manner by the CDS 200a, regardless of whether the data source is in the form of a database 210a or a file 210b. The details discussed with respect to a database data source 210a can be generalized to other types of data sources 210, including a file data source 210b. For example, a partition can refer to a grouping used on a text (or other field type) resulting from an operation that is similar to SQL GROUP BY. A partition may also be referred to as a "grouping." A grouping may include data from a database 210a or a file 210b. A unit of data included in a grouping may be referred as a "data item." A data item may be a row in case of a database 210a or a line in case of a file 210b. The column or field to group by can be any type that can provide partitions of appropriate size for comparison (e.g., provide uneven or non-uniform distribution). Some details relating to the group by column/field are explained further below.

At data flow action 2, the CDS 200a determines which partition(s) have changed. The number of rows for the partitions obtained at data flow action 1 may be compared to the number of rows for corresponding partitions obtained at a previous time. The current number of rows in partitions may be referred to as "current grouping data," and the number of rows for various partitions from a previous time may be referred to as "historical grouping data." The CDS 200a can compare the current grouping data against the historical grouping data to determine whether the number of rows for a particular partition changed. For example, if the number of rows for Day 1 is 1,000 in the historical grouping data, but the number of rows for Day 1 is 1,050 in the current grouping data, the partition for Day 1 is a candidate for checking whether the actual data changed. It is likely that 50 new rows were added for Day 1, and the CDS 200a can determine which rows of 1,050 are new and extract them to forward to a destination system 270. In this manner, the CDS 200a may identify one or more partitions that have changed.

At data flow action 3, the CDS 200a obtains data for any identified changed partition(s). In particular, once the CDS 200a identifies a changed partition, the CDS 200a obtains the data for the particular partition from the data source 210. In the example above, the CDS 200a requests the 1,050 rows for Day 1. The CDS 200a can store the 1,050 rows locally, e.g., in local storage 250a. The 1,050 rows can then be used for comparison the next time the data for this partition is changed.

At data flow action 4, the CDS 200a compares the obtained data with the local version of the changed partition. The CDS 200a can compare the downloaded data against a corresponding local version of the data. For example, the CDS 200a may have stored the 1,000 rows for Day 1 from a previous time in local storage 250a. The data for the partition from a previous time may be referred to as "historical partition data." Similarly, the current data for the partition may be referred to as "current partition data." The local version of the data may include data for one partition or a number of partitions. By comparing the 1,050 current rows for Day 1 in the current partition data to the 1,000 previous rows for Day 1 in the historical partition data, the CDS 200a may identify which 50 rows have changed. These 50 rows can be flagged or put in a file so that they can be sent to any relevant destination system 270.

At data flow action 5, the CDS 200a forwards the changed data to the destination system 270. As explained above, the changed data may be extracted from the current partition data, saved to a file, and sent to the destination system 270. The destination system 270 may then store the received data in its storage device(s) without having to check whether any duplicate exists in the received data. Because the CDS 210a can send the exact changed data, the destination system 270 can simply store what it receives from the CDS 210a and does not need to implement much functionality at its end.

In FIG. 2A, in order to compare the current partition data to the historical partition data, the CDS 200a may locally maintain all or a subset of the data from a data source 210. However, in some cases, the local storage 250a may have limited storage space, and the CDS 200a may not be able to store all of the data used in the comparison. Accordingly, in such cases, the CDS 200a may maintain a compressed version of the data from a data source 210 for comparison. In some embodiments, the compressed version of the data can be one or more Bloom filters. Such embodiments are described in further detail in connection with FIG. 2B.

Figure 2B:
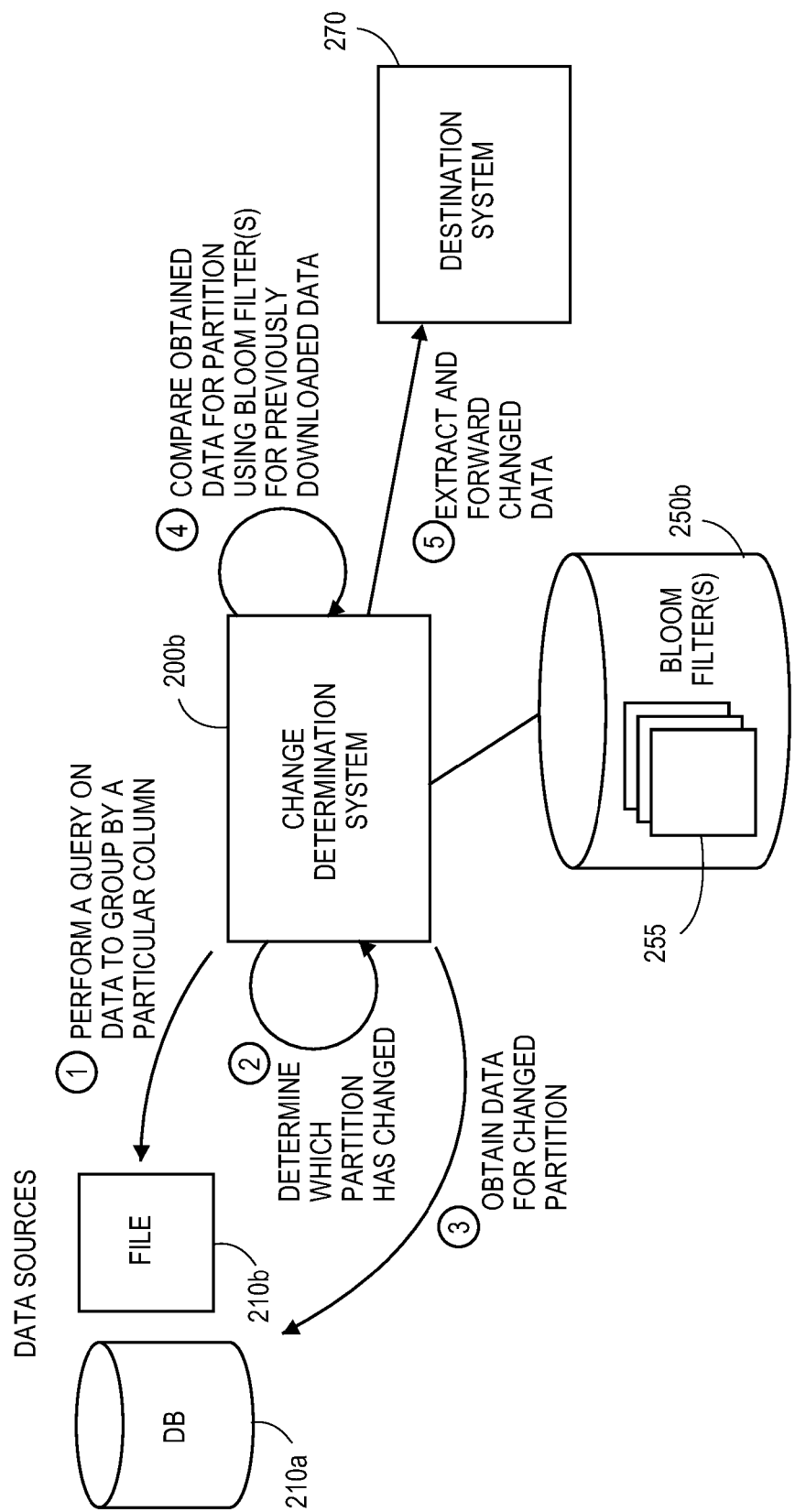
FIG. 2B is a data flow diagram illustrative of the interaction between the various components of a change determination system configured to determine and obtain changes in data of a plurality of data sources, according to another embodiment.

FIG. 2B is a data flow diagram illustrative of the interaction between the various components of a change determination system 200b configured to determine and obtain changes in data of a plurality of data sources, according to another embodiment. The CDS 200b and corresponding components of FIG. 2B may be similar to or the same as the CDS 100, 200a and similarly named components of Figures and 2A.

Data flow actions 1-5 can be similar to data flow actions 1-5 in FIG. 2A. Certain details relating to the CDS 200b are explained above in more detail in connection with FIG. 2A. In general, though, at data flow action 1, the CDS 200b performs a query on the data in a data source 210 to group by a particular column. At data flow action 2, the CDS 200b determines which partition has changed. At data flow action 3, the CDS 200b obtains data for the changed partition.

As explained above, a Bloom filter(s) can be used in comparison of the current partition data and the historical partition data. A Bloom filter may refer to a space-efficient probabilistic data structure that is used to test whether an element is a member of a set (e.g., data items are part of a partition). False positive matches are possible, but false negatives are not. For example, a query can return either "possibly in set" or "definitely not in set." Elements can be added to the set, but generally cannot be removed. As more elements are added to the set, the probability of false positives becomes larger.

In one embodiment, a Bloom filter used by the CDS 200b is a bit array of m bits and has k different hash functions that are used to add an element to the Bloom filter. In order to add an element to the Bloom filter, an element is fed to each of the k hash functions to get k array positions. The bits at these k positions are set to 1. In order to query for an element to determine whether it is in the set, the element is fed to each of the k hash functions to get the k array positions. If any of the bits at these positions is 0, the element is definitely not in the set. If all of the bits at these positions are 1, the element is either in the set, or the bits were set to 1 by chance when adding other elements. If the bits were set to 1 by chance, this can lead to a false positive. The Bloom filter is not required to store the elements themselves.

Although a risk of false positives exists, Bloom filters can provide a strong space advantage over other data structures for representing sets, such as self-balancing binary search trees, hash tables, simple arrays, linked lists, etc. Other data structures may require storing at least the data items themselves, which can require anywhere from a small number of bits (e.g., for small integers) to an arbitrary number of bits (e.g., for strings). On the other hand, a Bloom filter with 1% error and an optimal value of k may require only about 9.6 bits per element (e.g., data item), regardless of the size of the elements. The space advantage can be partly due to the compactness of the Bloom filter, inherited from arrays, and partly due to the probabilistic nature of the Bloom filter. The 1% false-positive rate can be reduced by a factor of ten by adding only about 4.8 bits per element.

At data flow action 4, the CDS 200b compares the current partition data to historical partition data using one or more Bloom filters 255. One or more Bloom filters 255 may be stored in local storage 250b. A Bloom filter can be created for the local version of the data. For example, at the time of a previous download, the CDS 200b may have added the data items from the data source 210 to a Bloom filter. Although the Bloom filter does not store the actual data items (e.g., the actual data items can be deleted after corresponding Bloom filters are generated), it can determine with high probability whether a data item is included in the previous version of the data or not. The Bloom filter can take up much less space than storing the historical or current partition data and can serve as a compressed version of the data. For each data item included in the current partition data, the CDS 200b can query the Bloom filter that includes the corresponding historical partition data to check whether the data item was included in the historical partition data or if it is new. In one embodiment, if n number of hash functions are defined for the Bloom filter, the Bloom filter applies the n hash functions to the data item to return n number of array positions. If any of the array positions is 0, the data item was not included in the historical partition data. If all array positions are 1, the data item was likely included in the historical partition data, although a small probability of false positive exists.

Partition data obtained from a data source 210 may include a number of individual data items (e.g., rows, lines, etc.), and the actual number of data items included in the data of a partition can vary; some partitions may include a small number of data items, and other partitions can include a large number of data items. In one embodiment, the size of a Bloom filter is predetermined, and it may not be optimal to use the same Bloom filter for a small amount of data and a large amount of data. The probability of the Bloom filter returning false positives increases with the number of elements added to the Bloom filter. Therefore, if too many elements are added, the Bloom filter may become saturated, and the accuracy of the Bloom filter can deteriorate, e.g., to a point of returning almost 100% false positives. Accordingly, Bloom filters of different sizes can be used to accommodate data of varying size. For example, a Bloom filter has a predetermined size of m bits when it is created and may not be able to accommodate data that includes more than a specific number of elements (e.g., x number of elements) without deterioration of accuracy. For data that includes more than x elements, a Bloom filter having a size larger than m bits can be used. Because the size of data from different data sources can vary, the CDS 200*b* may use a series of Bloom filters of increasing size in order to accommodate different data size. For instance, the CDS 200*b* may have a number of Bloom filters of varying sizes available for use, or may create one as needed. In one example, the CDS 200*b* may begin with a Bloom filter having a size of m bits, and if this Bloom filter is too small for the data, the CDS 200*b* may select or create a Bloom filter having a size of m+y bits and so on until the CDS 200*b* finds a Bloom filter having the right size for the data. The data from various data sources 210 may share the same set of Bloom filters. Or in certain embodiments, the CDS 200*b* may keep Bloom filters for different data sources 210 separate from each other.

In one embodiment, the CDS 200*b* may store Bloom filters 255 on storage that provides high accessibility. For example, the local storage 250*b* can include storage that is a type which is more accessible than storage used by a destination system 270. For example, the local storage 250*b* can use Network Attached Storage (NAS) since it is very accessible to attached devices. A more accessible storage type may be more expensive than less accessible storage type, and since Bloom filters can save space, the CDS 200*b* can reduce costs associated with the local storage 250*b*.

At data flow action 5, the CDS 200*b* extracts and forwards the changed data to the destination system 270. This step can be similar to data flow action 5 of FIG. 2A. The CDS 200*b* can forward the changed data to one or more destination systems 270.

Figure 3:
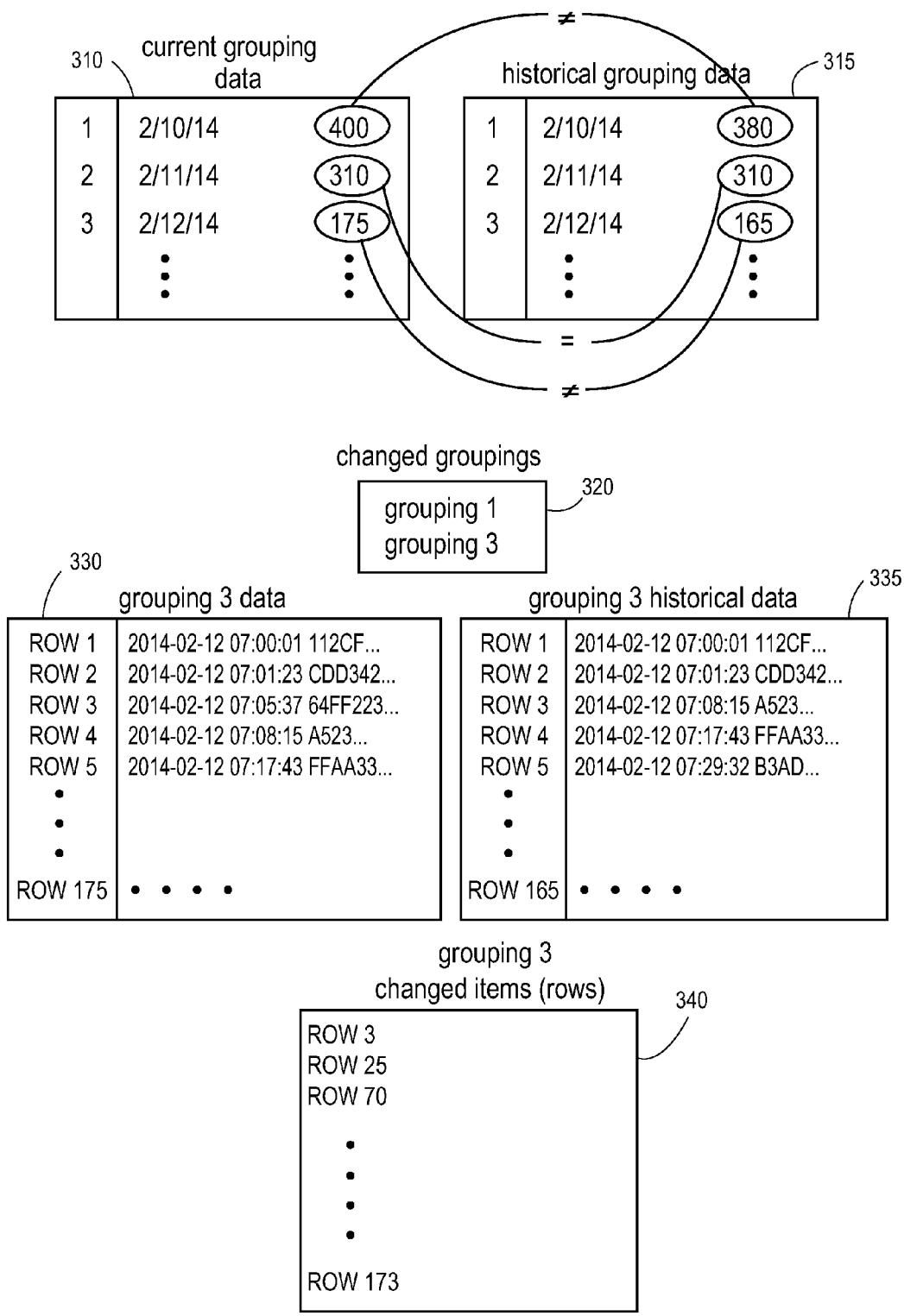
FIG. 3 is an example of information obtained from a data source and/or information processed by the change determination system.

FIG. 3 is an example of information obtained from a data source and/or information processed by the change determination system. A specific, illustrative example will be explained with respect to FIG. 3. Various aspects will be explained with reference to the CDS 200*a* in FIG. 2A, but the example can also apply to the CDS 100, 200*b* of FIGS. 1 and 2B. The example will refer to data of a data source 210 at time T0 and data of the data source 210 at time T1, where T0 is earlier than T1.

At time T1, the CDS 200*a* performs a query on the data of the data source 210 to group the data by the last changed or updated column or field. The data can be grouped into one or more groupings based on the date. The data source 210 can return a result that includes groupings 310 organized by date. The result can be referred to as "current grouping data." The current grouping data 310 may list the date for a grouping and the number of data items included in that grouping. The current grouping data 310 shows that Grouping 1 is for 2/10/14, and the number of data items in Grouping 1 is 400; Grouping 2 is for 2/11/14, and the number of data items in Grouping 2 is 310; and Grouping 3 is for 2/12/14, and the number of data items in Grouping 3 is 175.

The CDS 200*a* compares the current grouping data 310 to historical grouping data 315. Historical grouping data 315 can include the grouping data obtained from the data source 210 at various times in the past. Historical grouping data 315 can include grouping data for one or more days. In FIG. 3, the historical grouping data 315 shows the grouping data at T0. The historical grouping data 315 shows that Grouping 1 is for 2/10/14, and the number of data items in Grouping 1 is 380; Grouping 2 is for 2/11/14, and the number of data items in Grouping 2 is 310; and Grouping 3 is for 2/12/14, and the number of data items in Grouping 3 is 165.

By comparing the number of data items in the same groupings at different points in time, the CDS 200 can identify that certain groupings have changed or are potential candidates having changed data items. The number of data items for Grouping 1 at T1 is 400, and the number of data items for Grouping 1 at T0 is 380. The number of data items for Grouping 2 at T1 is 310, and the number of data items for Grouping 2 at T0 is 310. The number of data items for Grouping 3 at T1 is 175, and the number of data items for Grouping 3 at T0 is 165. The CDS 200*a* can see that the number of data items in Groupings 1 and 3 changed from T0 to T1, while the number of data items in Grouping 2 remained the same from T0 to T1. From this comparison, the CDS 200*a* can determine that data for Grouping 1 and Grouping 3 may have changed and should be obtained from the data source 210. The CDS 200*a* may keep track of the changed groupings 320, e.g., to request data from these groupings from the data source 210. For example, the changed groupings 320 information can list Groupings 1 and 3.

The CDS 200*a* obtains the data for Grouping 1 from the data source 210, and also obtains the data for Grouping 3 from the data source 210 (or some summary of the groupings, such as Bloom filters, in other embodiments). The example will be further explained with the obtained Grouping 3 data 330. Grouping 3 data 330 includes all 175 data items included in the grouping. The data source 210 can be a database 210*a*, and Grouping 3 data 330 may include rows as data items. Each row in Grouping 3 data 330 can include the date and time for the row (e.g., the timestamp of the last updated column) and the data of that row.

The CDS 200*a* compares Grouping 3 data 330 against Grouping 3 historical data 335. Grouping 3 data 330 can be associated with T1, and Grouping 3 historical data 335 can be associated with T0. For example, Grouping 3 historical data 335 can be Grouping 3 data that was obtained at T0. Grouping 3 historical data may also include rows as data items. Each row in Grouping 3 historical data 335 can also include the date and time for the row and the data of that row. By comparing Grouping 3 data 330 and Grouping 3 historical data 335, the CDS 200*a* can determine that Row 3 changed, for example, Row 3 may have been inserted after T0. The CDS 200*a* flags Row 3 as a data item to send to a destination system 270. By going through the rest of Grouping 3 data 330 and Grouping 3 historical data 335, the CDS 200*a* identifies 10 rows in this example that were added. The CDS 200*a* can keep track of the changed data items in a list, such as Grouping 3 changed items list 340. In some embodiments, instead of comparing the data items to the previous version of the data items, the CDS 200*a* uses a Bloom filter to which the data items in the previous version have been added. The CDS 200*a* queries the Bloom filter to determine if a data item is in the set.

The CDS 200*a* may obtain grouping information for all dates for which data is available in the data source 210. For example, a data source 210 contains data for 1,000 days, the CDS 200*a* can get the grouping information for all 1,000 days. Or the CDS 200*a* may specify a timeframe for which it wants to obtain grouping information, such as 60 days. Grouping information can be easily obtained from a data source 210 without placing a burden on the resources of the data source 210. By comparing to historical grouping information, the CDS 200a can easily identify which groupings may have changed data.

Because comparison of grouping information can make it easy to spot changed data over a long period of time, the CDS 200a can capture all of the changes in the data. For example, in a system that downloads data for last 5 days may miss any data items whose last updated timestamp has changed to fall outside this 5-day window. However, the CDS 200a can detect that a data item has been removed or added to a particular grouping in any time window. For example, a user accidentally changes the last updated timestamp for Row 1 to Day 1 of Day 1,000. The system that only downloads last 5 days of data will miss Row 1, but the CDS 200a will recognize Row 1 as a change because it will be reflected in the number of data items for Day 1 in the grouping information.

The grouping unit or size and the grouping column can be selected such that most of the new data added to the data source 210 falls into one of the grouping units. In one embodiment, the grouping unit or size can relate to the desired latency of the pipeline, and the grouping column can relate to the distribution. The grouping unit or size may be selected at different levels of granularity. For example, a grouping may be based on a unit of multiple days, a day, multiple hours, an hour, etc. The unit or size of a grouping can be selected as appropriate, e.g., based on the requirements of the data source 210, CDS 200a, and/or the destination system 270. The unit or size of a grouping can be specified at a level that provides a meaningful comparison of groupings. In some embodiments, the grouping unit that leads to an even distribution of data items into groupings may not be very helpful since each grouping will have a change to the number of data items, and the CDS 200a has to check almost all groupings. For example, if GROUP BY was by an hour, instead of a day, the partition for each hour will probably include a few rows, and almost all partitions would have to be checked, which can lead to obtaining data for most of the partitions. On the other hand, GROUP BY by a day will probably lead to recently added data falling into the more recent partitions. Under similar reasoning, the column or field used for grouping by can have a characteristic that leads to more "skewed" distribution than even distribution. In one example, if the data items were grouped by first letter of a person's last name, the grouping for each alphabet letter will likely contain new data items, and groupings for all alphabet letters will have to be checked. In other embodiments, even distribution of data items may be desired, and accordingly, the grouping unit or size and the grouping column can be selected to provide an even distribution of data items. For example, this may be done such that most of data items to be processed are not placed into one grouping.

In the example where the data is grouped by the last updated column, the CDS 200a may not distinguish between a data item that has been added and an existing data item that has been updated. In certain embodiments, the CDS 200a may implement a way to distinguish between the two types of change. For example, each data item may be assigned a unique identifier, e.g., when the data item is stored locally in local storage 250a. The unique identifier can be used to track whether a data item has been updated. In this case, the CDS 200a may not be able to use Bloom filters since actual data is not stored in Bloom filters.

In some embodiments, the CDS 200a may recognize that some data items have been deleted. For instance, the number of data items for a grouping may have decreased in comparison the previous number of data items for that grouping. The CDS 200a can identify the deleted data by comparing the data for the grouping to the local version of the data for the grouping. The CDS 200a may send information to the destination system 270 that the identified data items have been deleted, and the destination system 270 can delete the data items from its storage based on the information sent by the CDS 200a.

As described above, the CDS 200a can offer many advantages. The CDS 200a can identify a changed subset of data in a data source 210 without downloading all of the data. The CDS 200a can do so for large amounts, which can be very efficient. Only a portion of the data that may include changes is downloaded to extract the actual change. The CDS 200a can also identify changes in a generic way and can work with various data sources 210. Often, the CDS 200a may not have any information about the data of a data source 210. For example, the CDS 200a may not know how the data is structured (e.g., database schema, file format, etc.), how frequently the data is updated, ways in which the data is updated, or how the data is updated. The CDS 200a may identify a column such as the last updated column that can indicate whether a data item might be new and proceed to identify changes by performing a group by on the selected column. The CDS 200a may also handle data in different formats, such as databases and files, in the same or a similar manner. Because the CDS 200a only obtains or grabs changed data from a data source 210 to send to a destination system 270, the CDS 200a may also be referred to as a "grabber."

Figure 4A:
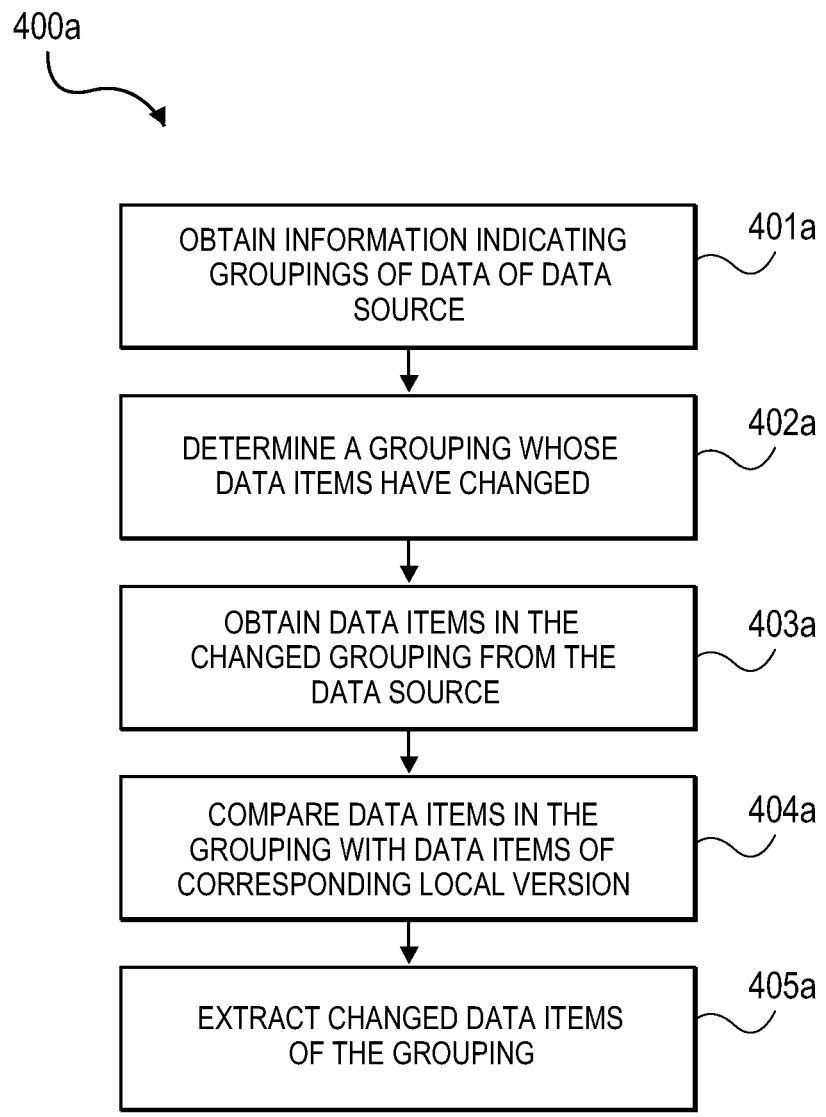
FIG. 4A is a flowchart illustrating one embodiment of a process for determining and obtaining changes in data of a plurality of data sources.

FIG. 4A is a flowchart illustrating one embodiment of a process 400a for determining and obtaining changes in data of a plurality of data sources. The process 400a may be implemented by one or more systems described with respect to FIGS. 1-2 and 5. For illustrative purposes, the process 400a is explained below in connection with the CDS 200a in FIG. 2A. Certain details relating to the process 400a are explained in more detail with respect to FIGS. 1-5. Depending on the embodiment, the process 400a may include fewer or additional blocks, and the blocks may be performed in an order that is different than illustrated.

At block 401a, the CDS 200a obtains information indicating groupings of data of a data source 210. The data may be stored in one or more files or databases in the data source 210. The information can indicate a number of data items included in each of the groupings. The groupings can be based on timestamps of respective data items. The timestamps can indicate respective times at which data items were last updated. In certain embodiments, the timestamps of the respective data items include the date and the time at which the respective data items were last updated, and the groupings are based on only the date of the timestamps of the respective data items. For example, a grouping operation is performed based on only the date of the timestamps associated with the data items. In such case, each grouping is associated with a specific date. In some embodiments, the groupings are based on field of respective data items that can provide an uneven distribution of data items included in each grouping.

The CDS 200a may obtain the information indicating the groupings of the data at an interval. The CDS 200a may also obtain the information indicating the groupings of the data in response to receiving a request from a destination system 270. The CDS 200a may obtain information indicating the groupings of the data stored in one or more files in the data source 210 using a first adapter. The CDS 200a may obtain information indicating the groupings of the data stored in one or more databases in the data source 210 using a second adapter. The first adapter and the second adapter may be different.

At block 402a, the CDS 200a determines a grouping whose data items have changed. The CDS 200a can determine whether data items of a grouping have changed by comparing a number of data items included in the grouping and a historical number of data items included in a corresponding local version of that grouping. The corresponding local version of the first grouping may be created based on data items included in the grouping at a time prior to obtaining the information indicating the groupings of the data. This time may be referred to as time T0.

At block 403a, the CDS 200a obtains data items in the changed grouping from the data source 210. A data item included in the grouping can be a row in the one or more databases of the data source 210 or a line in the one or more files in the data source 210. In certain embodiments, if the data source 210 includes one or more files, the CDS 200a can check the timestamp of a file and compare it to the timestamp of the previous version of the file in order to determine whether the file may include new data. By comparing the timestamps of the current file and the previous version of the file, the CDS 200a does not need to parse through the data in the file to determine whether new data has been added. In such embodiments, the CDS 200a may not obtain grouping information. In addition, with respect to blocks 402a and 403a, the CDS 200a can directly compare the data items in the current file and the data items in the previous version of the file, instead of determining changed grouping(s) and/or obtaining the data items in the changed grouping from the data source 210.

At block 404a, the CDS 200a compares data items in the grouping with the data items of the corresponding local version of the grouping. By comparing the data items, the CDS 200 can determine which data items of the grouping from the data source 210 have changed. The corresponding local version of the grouping can include a copy of the data items included in the grouping at T0. In certain embodiments, where the data source 210 includes one or more files, the CDS 200a can treat each newline in the file as a data item and compare the data items in the current file and the data items in the previous version of the file to identify the changed data items.

At block 405a, the CDS 200a extracts the changed data items of the grouping. The CDS 200a can forward the extracted changed data items to one or more destination systems 270.

If the number of data items included in the grouping is higher than the historical number of data items included in the corresponding local version of the grouping, the CDS 200a can identify the changed data items as added or updated data items, and forward the changed data items to the destination system 270 to be stored. If the number of data items included in the grouping is lower than the historical number of data items included in the corresponding local version of the grouping, the CDS 200a can identify the changed data items as deleted data items, and forward the changed data items to the destination system 270 to be removed.

In some embodiments, the CDS 200a assigns a unique identifier to each of the data item included in the grouping. The CDS 200a can determine whether a changed item is a new data item or an updated data item based on the unique identifier associated with the changed data item.

Figure 4B:
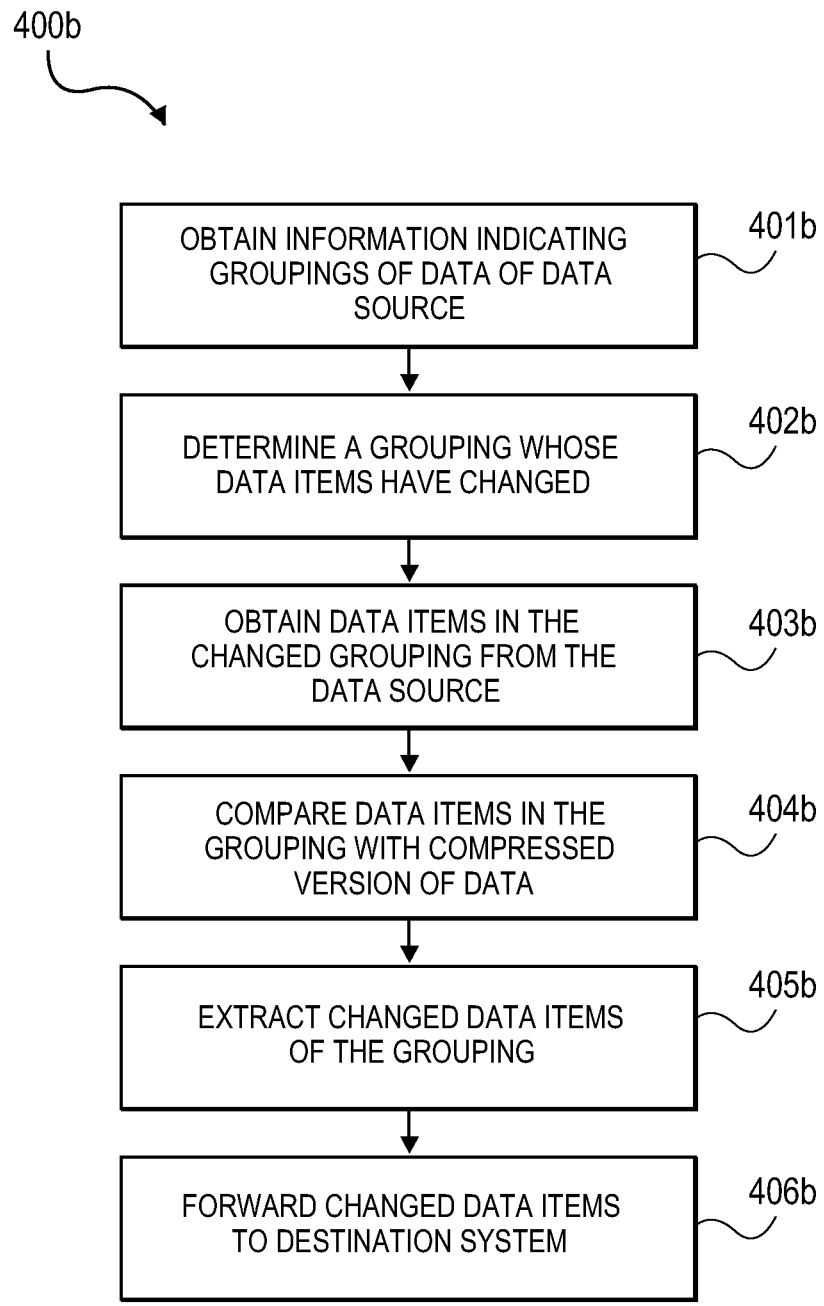
FIG. 4B is a flowchart illustrating another embodiment of a process for determining and obtaining changes in data of a plurality of data sources.
Figure 5:
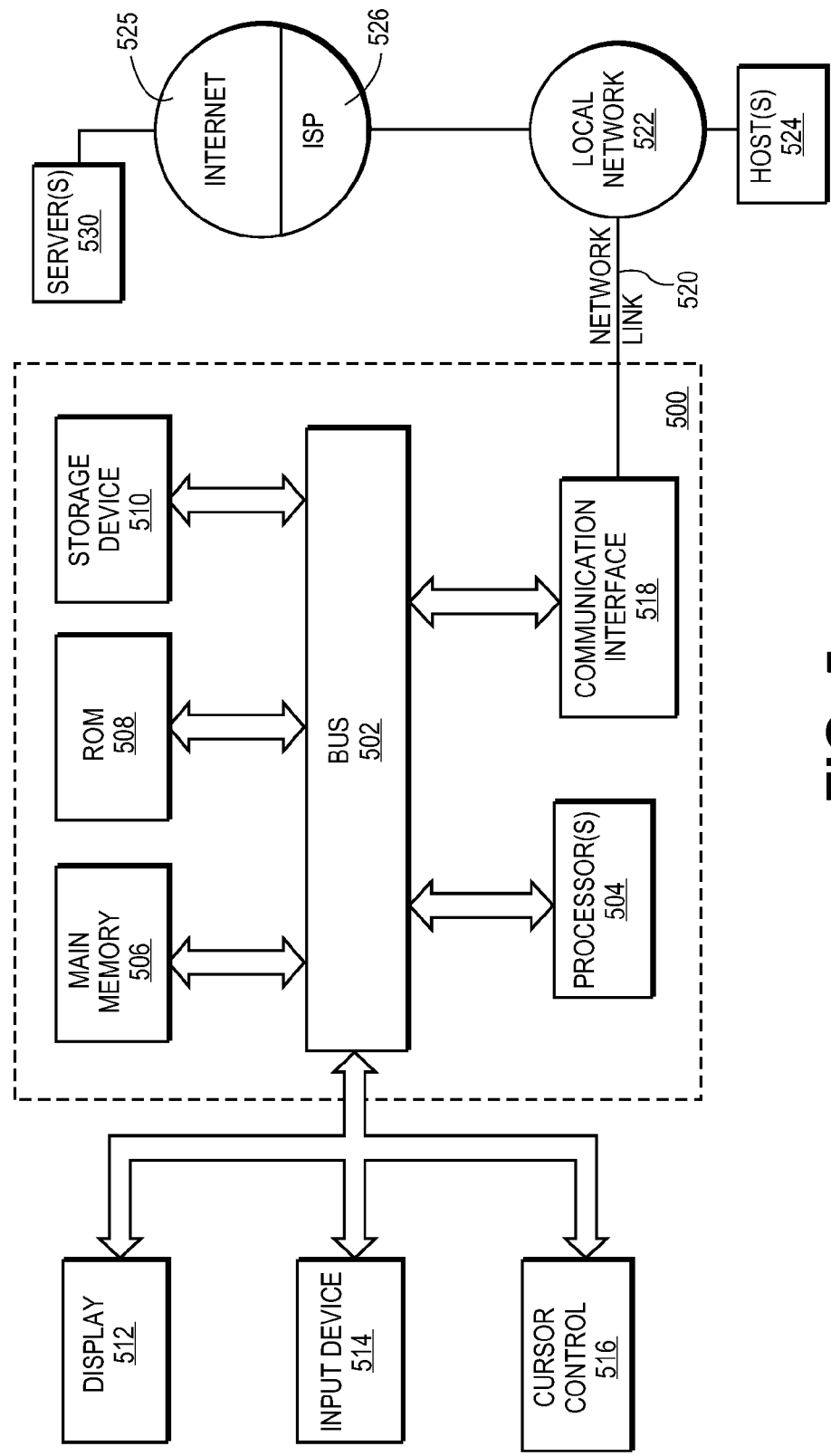
FIG. 5 is a block diagram illustrating a computer system with which certain methods discussed herein may be implemented.

FIG. 4B is a flowchart illustrating another embodiment of a process 400b for determining and obtaining changes in data of a plurality of data sources. The process 400b may be implemented by one or more systems described with respect to FIGS. 1-2 and 5. For illustrative purposes, the process 400b is explained below in connection with the CDS 200b in FIG. 2B. Certain details relating to the process 400b are explained in more detail with respect to FIGS. 1-5. Depending on the embodiment, the process 400b may include fewer or additional blocks, and the blocks may be performed in an order that is different than illustrated.

At block 401b, the CDS 200b obtains information indicating groupings of data of a data source 210. The data source 210 may be a database or a file. The information can indicate a number of data items included in each of the groupings. The groupings can be based on timestamps of respective data items. The timestamps can indicate respective times at which data items were last updated.

At block 402b, the CDS 200b determines a grouping whose data items have changed. The CDS 200b can determine whether data items of a grouping have changed by comparing a number of data items included in the grouping and a historical number of data items included in each of the groupings. For example, the historical number of data items included in each of the groupings may be stored in historical grouping data 315 discussed with respect to FIG. 3.

At block 403b, the CDS 200b obtains data items in the changed grouping from the data source 210. If the data source 210 is a database 210a, a data item included in the grouping can be a row, and if the data source 210 is a file 210b, a data item included in the grouping can be a line.

At block 404b, the CDS 200b compares data items in the grouping with a compressed version of the data. The CDS 200b can compare the data items in the grouping with a corresponding local version of the grouping, which can be a compressed version of the data. Based on the comparison, the CDS 200b can determine which data items of the grouping from the data source 210 have changed. The compressed version of the data may be a space-efficient probabilistic data structure, such as a Bloom filter. The space-efficient probabilistic data structure may include information about data items included in the grouping at a time prior to obtaining the information indicating the groupings of the data of the data source 210. This time may be referred to as time T0. The space-efficient probabilistic data structure can identify whether a data item included in the grouping was included in the grouping at the prior time (e.g., time T0). In some embodiments, the space-efficient probabilistic data structure is a Bloom filter. The Bloom filter may be selected from multiple Bloom filters each having a different size. The compressed version of the data may not comprise a copy of the grouping.

The compressed version of the data is stored on local storage 250b, and the extracted changed data items forwarded to the destination system 270 are stored on storage in the destination system 270. In certain embodiments, the local storage 250b has a smaller storage capacity than the destination system 270 storage. In one embodiment, the local storage 250b includes NAS.

At block 405b, the CDS 200b extracts the changed data items of the grouping. At block 406b, the CDS 200b forwards the changed data items to the destination system 270. Blocks 405b and 406b can be similar to blocks 405a in FIG. 4A.

Implementation Mechanisms

According to one embodiment, the techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 8 is a block diagram that illustrates a computer system 500 upon which an embodiment may be implemented. For example, the computing system 500 may comprises a server system that accesses law enforcement data and provides user interface data to one or more users (e.g., executives) that allows those users to view their desired executive dashboards and interface with the data. Other computing systems discussed herein, such as the user (e.g., executive), may include any portion of the circuitry and/or functionality discussed with reference to system 500.

Computer system 500 includes a bus 502 or other communication mechanism for communicating information, and a hardware processor, or multiple processors, 504 coupled with bus 502 for processing information. Hardware processor(s) 504 may be, for example, one or more general purpose microprocessors.

Computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 808 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

Computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 525. Local network 522 and Internet 525 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 525, ISP 526, local network 522 and communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system configured to efficiently determine changed data items in a remote data source, the computer system comprising:
   one or more hardware computer processors configured to execute software code stored in a tangible storage device in order to:
   determine a quantity of data items included in a group of data items in a remote data source;
   compare the quantity of data items included in the group to a quantity of data items included in a previous version of the group to determine a change in the quantity of data items included in the group;
   in response to determining the change, compare the data items included in the group to corresponding data items included in a compressed local version of the group to determine which data items of the group have changed; and
   based on the comparison, identify the data items of the group that have changed.

2. The system of claim 1, wherein the group of data items is one of a plurality of groupings of data items, wherein the data items of the plurality of groupings are grouped based on timestamps of respective data items, and wherein the timestamps indicate respective times at which data items were last updated.

3. The system of claim 2, wherein the timestamps of the respective data items include a date and a time at which the respective data items were last updated, and wherein the data items of the plurality of groupings are grouped based on only the date of the timestamps of the respective data items.

4. The system of claim 3, wherein each of the plurality of groupings is associated with at least one of: a different date, or a range of dates.

5. The system of claim 1, wherein the group of data items is one of a plurality of groupings of data items, and wherein the data items of the plurality of groupings are grouped based on a first field of respective data items, the first field configured to provide an uneven distribution of data items included in each of the plurality of groupings.

6. The system of claim 1, wherein the previous version of the group comprises a copy of the data items included in the group at a first time prior to said determining a quantity of data items in the group of data items.

7. The system of claim 1, wherein the one or more hardware computer processors are further configured to execute software code in order to:
   in response to determining that the quantity of data items included in the first group is greater than the quantity of data items included in the previous version of the group:
   identify the changed data items as added or updated data items; and
   forward the changed data items to a destination system to be stored.

8. The system of claim 1, wherein the one or more hardware computer processors are further configured to execute software code in order to:
   in response to determining that the quantity of data items included in the first group is less than the quantity of data items included in the previous version of the group:
   identify the changed data items as deleted data items; and
   forward the changed data items to a destination system to be removed.

9. The system of claim 1, wherein the one or more hardware computer processors are further configured to execute software code in order to:
   assign a unique identifier to each of the data items included in the group; and
   determine whether a first changed data item is a new data item or an updated data item based on the unique identifier associated with the first changed data item.

10. The system of claim 1, wherein a data item included in the group is a row in a database or a line in a file.

11. The system of claim 1, wherein the one or more hardware computer processors are further configured to execute software code in order to:
    obtain the information indicating an update to the group of data items at an interval.

12. The system of claim 1, wherein comparing the data items is performed in response to determining the quantity of data items included in the group is different from the quantity of data items included in the previous version of the group.

13. The computer system of claim 1, wherein comparing the data items included in the group to corresponding data items included in the compressed local version of the group comprises querying the compressed local version of the group.

14. The computer system of claim 1, wherein the compressed local version of the group is a space-efficient probabilistic data structure including information about data items included in the group at a first time prior to said determining a quantity of data items in the group of data items.

15. The computer system of claim 14, wherein the space-efficient probabilistic data structure is configured to determine whether a particular data item included in the group was included in the group at the first time.

16. The computer system of claim 14, wherein the space-efficient probabilistic data structure is a Bloom filter, and wherein the Bloom filter is selected from a plurality of Bloom filters that can each include a different number of data items.

17. The computer system of claim 1, wherein the compressed local version of the group does not comprise a copy of the data items of the group.

18. The computer system of claim 1, wherein the compressed local version of the group and the previous version of the group are the same.

19. A method of efficiently determining changed data items at a remote data source, the method comprising:

determining, by one or more hardware computer processors, a quantity of data items included in a group of data items at a remote data source;

comparing, by the one or more hardware computer processors, the quantity of data items included in the group to a quantity of data items included in a previous version of the group to determine a change in the quantity of data items included in the group;

in response to determining the change, comparing, by the one or more hardware computer processors, the data items included in the group to corresponding data items included in a local version of the group to determine which data items of the group have changed; and based on the comparison, identifying, by the one or more hardware computer processors, the data items of the group that have changed.

20. The method of claim 19, wherein the group of data items is one of a plurality of groupings of data items, wherein the data items of the plurality of groupings are grouped based on timestamps of respective data items, and wherein the timestamps indicate respective times at which data items were last updated.

21. The method of claim 19, wherein the group of data items is one of a plurality of groupings of data items, and wherein the data items of the plurality of groupings are grouped based on a first field of respective data items, the first field configured to provide an uneven distribution of data items included in each of the plurality of groupings.

22. The method of claim 19, wherein the local version of the group is a compressed version of the group.

23. A non-transitory computer readable medium comprising instructions for efficiently determine changed data items at a remote data source, the instructions configured to cause a computer processor to:

determine a quantity of data items included in a group of data items at a remote data source;

compare the quantity of data items included in the group to a quantity of data items included in a previous version of the group to determine a change in the quantity of data items included in the group;

in response to determining the change, compare the data items included in the group to corresponding data items included in a local version of the group to determine which data items of the group have changed; and based on the comparison, identify the data items of the group that have changed.

\* \* \* \* \*